(12) United States Patent
Klein et al.

(10) Patent No.: US 11,972,095 B2
(45) Date of Patent: Apr. 30, 2024

(54) VOICE ASSISTANT-ENABLED CLIENT APPLICATION WITH USER VIEW CONTEXT AND MULTI-MODAL INPUT SUPPORT

(71) Applicant: MICROSOFT TECHNOLOGY LICENSING, LLC, Redmond, WA (US)

(72) Inventors: Tudor Buzasu Klein, Yokohama (JP); Viktoriya Taranov, Kirkland, WA (US); Sergiy Gavrylenko, Issaquah, WA (US); Jaclyn Carley Knapp, Redmond, WA (US); Andrew Paul McGovern, Redmond, WA (US); Harris Syed, Redmond, WA (US); Chad Steven Estes, Redmond, WA (US); Jesse Daniel Eskes Rusak, Redmond, WA (US); David Ernesto Heekin Burkett, Redmond, WA (US); Allison Anne O'Mahony, Redmond, WA (US); Ashok Kuppusamy, Redmond, WA (US); Jonathan Reed Harris, Redmond, WA (US); Jose Miguel Rady Allende, Redmond, WA (US); Diego Hernan Carlomagno, Redmond, WA (US); Talon Edward Ireland, Redmond, WA (US); Michael Francis Palermiti, II, Redmond, WA (US); Richard Leigh Mains, Redmond, WA (US); Jayant Krishnamurthy, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 229 days.

(21) Appl. No.: 17/508,762

(22) Filed: Oct. 22, 2021

(65) Prior Publication Data

US 2022/0308718 A1 Sep. 29, 2022

Related U.S. Application Data

(63) Continuation-in-part of application No. 17/364,362, filed on Jun. 30, 2021, now Pat. No. 11,789,696.

(Continued)

(51) Int. Cl.
*G06F 3/0484* (2022.01)
*G06F 3/16* (2006.01)
(Continued)

(52) U.S. Cl.
CPC ............ *G06F 3/0484* (2013.01); *G06F 3/167* (2013.01); *G10L 15/08* (2013.01); *G10L 15/22* (2013.01); *G10L 2015/088* (2013.01)

(58) Field of Classification Search
None
See application file for complete search history.

(56) References Cited

U.S. PATENT DOCUMENTS 5,231,691 A * 7/1993 Yasuda ..................... G06F 3/16
704/E15.04
6,757,362 B1 6/2004 Cooper et al.
(Continued)

FOREIGN PATENT DOCUMENTS

CN 108269460 A 7/2018
CN 110197662 A 9/2019
(Continued)

OTHER PUBLICATIONS

"Notice of Allowance Issued in U.S. Appl. No. 17/364,362", dated May 8, 2023, 8 Pages.
(Continued)

*Primary Examiner* — Ryan Barrett
(74) *Attorney, Agent, or Firm* — Shook, Hardy & Bacon L.L.P.

(57) ABSTRACT

Various embodiments discussed herein enable client applications to be heavily integrated with a voice assistant in
(Continued)

order to perform commands associated with voice utterances of users via voice assistant functionality and also seamlessly cause client applications to automatically perform native functions as part of executing the voice utterance. Such heavy integration also allows particular embodiments to support multi-modal input from a user for a single conversational interaction. In this way, client application user interface interactions, such as clicks, touch gestures, or text inputs are executed alternative or in addition to the voice utterances.

20 Claims, 23 Drawing Sheets

Related U.S. Application Data

(60) Provisional application No. 63/165,037, filed on Mar. 23, 2021.

(51) Int. Cl.
 G10L 15/08 (2006.01)
 G10L 15/22 (2006.01)

(56) References Cited

U.S. PATENT DOCUMENTS

| | | | |
|---|---|---|---|
| 7,739,116 | B2 | 6/2010 | Miyamoto et al. |
| 7,805,299 | B2 | 9/2010 | Coifman |
| 8,731,942 | B2 | 5/2014 | Cheyer et al. |
| 8,874,447 | B2 * | 10/2014 | Da Palma ............... G10L 15/22 704/270.1 |
| 9,172,747 | B2 | 10/2015 | Walters et al. |
| 9,570,070 | B2 | 2/2017 | Baldwin et al. |
| 9,858,925 | B2 | 1/2018 | Gruber et al. |
| 10,614,799 | B2 | 4/2020 | Kennewick et al. |
| 10,672,280 | B1 * | 6/2020 | Barber ................. G08G 5/0034 |
| 2005/0171664 | A1 * | 8/2005 | Konig ..................... G10L 15/22 704/E15.04 |
| 2006/0247925 | A1 * | 11/2006 | Haenel .................... G10L 15/22 704/E15.04 |
| 2008/0279366 | A1 | 11/2008 | Lindbergh |
| 2009/0171659 | A1 | 7/2009 | Pearce et al. |
| 2011/0214162 | A1 * | 9/2011 | Brakensiek ............. G06F 3/167 726/4 |
| 2013/0219277 | A1 | 8/2013 | Wang et al. |
| 2014/0075330 | A1 * | 3/2014 | Kwon ..................... G06F 3/038 715/750 |
| 2015/0336588 | A1 * | 11/2015 | Ebner ..................... G06F 40/00 701/2 |
| 2016/0070342 | A1 | 3/2016 | Trahan et al. |
| 2016/0132234 | A1 | 5/2016 | Seto et al. |
| 2017/0024375 | A1 | 1/2017 | Hakkani-Tur et al. |
| 2018/0164957 | A1 * | 6/2018 | Schon ....................... G06F 3/14 |
| 2018/0173405 | A1 * | 6/2018 | Pereira ............... G06F 3/04883 |
| 2018/0335921 | A1 * | 11/2018 | Karunamuni ....... G06F 3/04842 |
| 2018/0335939 | A1 * | 11/2018 | Karunamuni ......... G06F 3/0481 |
| 2019/0155571 | A1 | 5/2019 | Rhee et al. |
| 2020/0110532 | A1 * | 4/2020 | Mani ..................... H04N 23/611 |
| 2021/0093794 | A1 * | 4/2021 | Volkar ............. A61M 5/31546 |
| 2022/0122583 | A1 | 4/2022 | Bates |
| 2022/0308718 | A1 * | 9/2022 | Klein ..................... G06F 3/167 |

FOREIGN PATENT DOCUMENTS

| | | |
|---|---|---|
| CN | 112764620 A | 5/2021 |
| EP | 3588267 A1 | 1/2020 |
| EP | 3246790 B1 | 11/2020 |

OTHER PUBLICATIONS

"Invitation to Pay Additional Fees Issued in PCT Application No. PCT/US22/021011", Mailed Date: Jun. 30, 2022, 13 Pages.

"International Search Report and Written Opinion Issued in PCT Application No. PCT/US22/021011", dated Aug. 25, 2022, 19 Pages.

"Non Final Office Action Issued in U.S. Appl. No. 17/364,362", dated Nov. 29, 2022, 19 Pages.

* cited by examiner

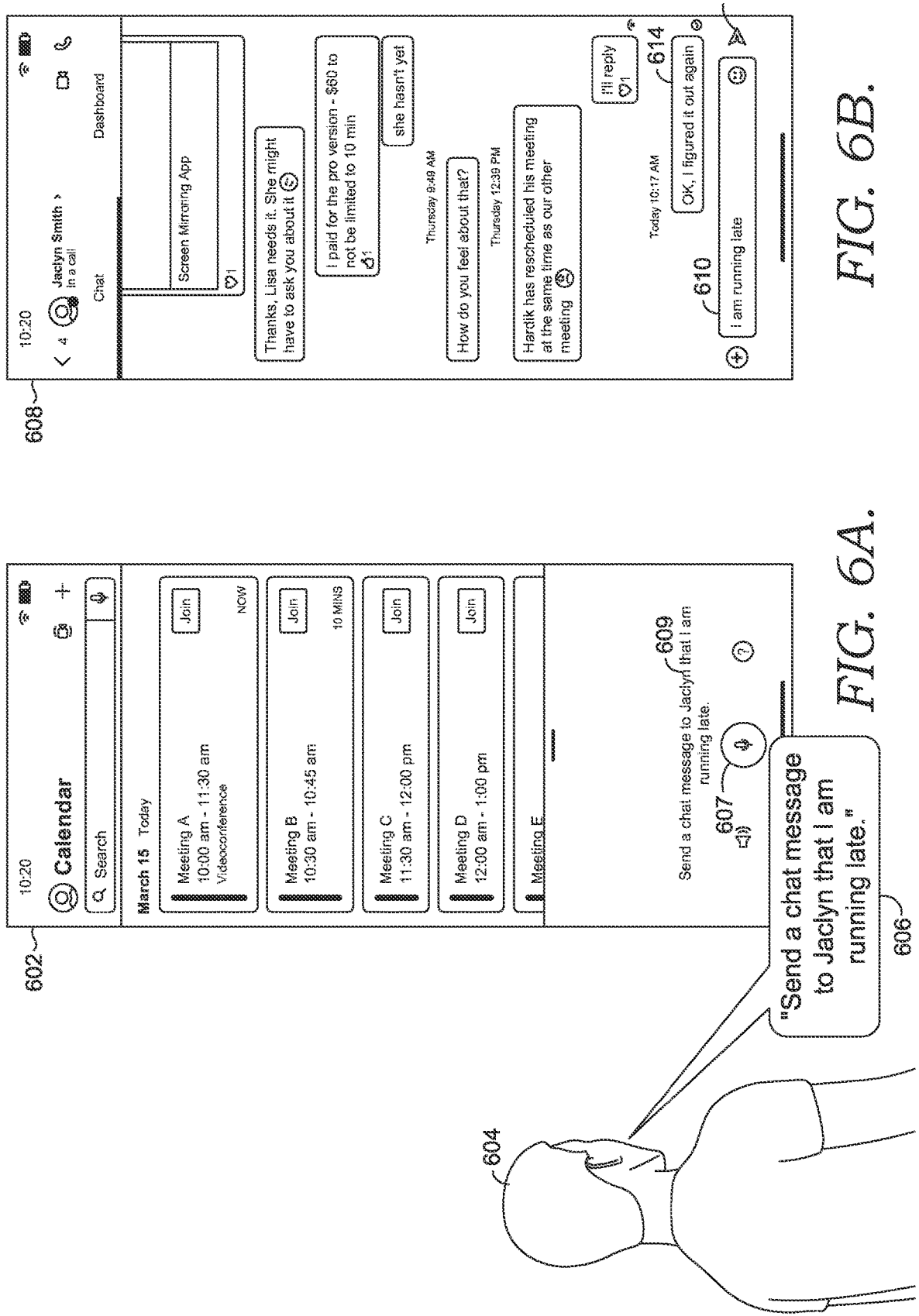

VOICE ASSISTANT-ENABLED CLIENT APPLICATION WITH USER VIEW CONTEXT AND MULTI-MODAL INPUT SUPPORT

CROSS-REFERENCE TO RELATED APPLICATIONS

This application is a continuation-in-part of U.S. application Ser. No. 17/364,362 entitled "Voice Assistant-Enabled Client Application With User View Context," filed Jun. 30, 2021, which claims the benefit of U.S. Provisional Application No. 63/165,037 entitled "Voice Assistant-Enabled Client Application With User View Context," filed Mar. 23, 2021, the contents each of which is herein incorporated by reference in its entirety.

INTRODUCTION

Users may rely on voice-enabled digital assistants (voice assistants) to carry out various tasks. For example, a user can issue a "wake word," which triggers activation of a smart speaker or voice assistant enabled computing device to listen for a voice utterance from the user. The user may then issue a voice utterance, which may comprise a voice command, such as a natural language request to perform a task (e.g., to play a particular song or activate a home device, among other things). The smart speaker (or voice assistant-enabled computing device) may then transmit the command to a voice recognition service and/or skill service to execute the command according to its skill capabilities.

Although voice assistant functionality can be used with particular client applications (e.g., a geolocation map application or an email application), such voice assistant functionality typically sits in a shell of an operating system or on top of a client application. This means that the voice assistance functionality is not adequately integrated with the client application so as to execute commands, perform requests, or otherwise perform operations associated with the voice utterances, and is therefore unable to cause meaningful interaction with the client application, such as by intelligently switching pages, populating fields, or supporting multi-modal input (e.g., both voice and manual user input) at a particular client application user interface. In other words, typical voice assistant functionality is not natively embedded in a client application such that the client application can perform seamless actions according to a voice utterance and other inputs. Such conventional functionality not only negatively affects the user experience and user interface capabilities, but also fails to accurately respond to many voice utterance requests, and negatively affects computer resource consumption, among other shortcomings.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Various embodiments discussed herein enable client applications, such as communications applications (for example, an email messaging application, an online meeting application, a collaboration platform, or other communications application), to be integrated with a voice assistant in order to both execute voice utterances of users (e.g., perform operations, requests, or carry out tasks associated with an utterance) via voice assistant functionality and also seamlessly cause the client applications to automatically perform native functions as part of executing the voice utterances. For example, some embodiments can automatically and intelligently cause a switch to a graphical user-interface page the user desires or needs to execute an intended task or action and automatically and intelligently cause a population of particular fields of the page with information according to the voice utterance.

In operation, some embodiments are directed to receiving voice utterance data and a user view context (e.g., data currently displayed on a user's screen) of a first instance (e.g., page or window) of a client application. Based at least in part on the utterance data and the user view context, various embodiments determine a user intent (e.g., predict what user interface task the user is trying to accomplish within a client application). For example, a voice utterance may be to "send Jane a chat message." Jane's full name (e.g., Jane Doe) or user identifier may be indicated at the first instance of the client application, or Jane's contact information may be otherwise discernable to the client application. Because the words "chat message" are referenced in the voice utterance and because the client application knows to which Jane the user is referring, the voice assistant may cause the client application to automatically switch from the first instance (e.g., a calendaring page) to a second instance (e.g., a chat page) within the same client application to execute the user's intended task. In response to determining the user intent, various embodiments cause the client application to automatically populate data at the first instance (or another instance) of the client application, where the populating of the data is at least partially based on executing the voice utterance of the user. For example, using the illustration above, embodiments can predict that the user intent is to switch to a chat page for a private conversation message or thread between the user and Jane Doe and to automatically populate a message field of the chat page with the message the user wants to send Jane Doe. This functionality improves existing voice assistant technologies in terms of the user experience, user interface capabilities, accuracy, and computing resource consumption, as described in more detail herein.

Some embodiments discussed herein enable voice assistants and client applications to support multi-model input (e.g., voice utterances, touch gestures, mouse clicks, text input, etc.) from a user for a single conversational interaction. In this way, client application user interface tasks are executed alternative or in addition to the voice utterances. For example, if two inputs are conflicting (e.g., user says "no" but clicks "yes"), some embodiments can receive an indication that a user has engaged in a manual input (e.g., a touch gesture or mouse click) at a user interface and then cause a client application to respond to only the manual input or voice utterance depending on which one was received last in time. This functionality improves natural human-computer interactions and the user navigation experience, as described in more detail herein.

BRIEF DESCRIPTION OF THE DRAWINGS

The present invention is described in detail below with reference to the attached drawing figures, wherein:

FIGS. 6A-6B are screenshots or pages of a user interface in connection with a voice utterance, according to some embodiments of this disclosure;

DETAILED DESCRIPTION

Figure 1:
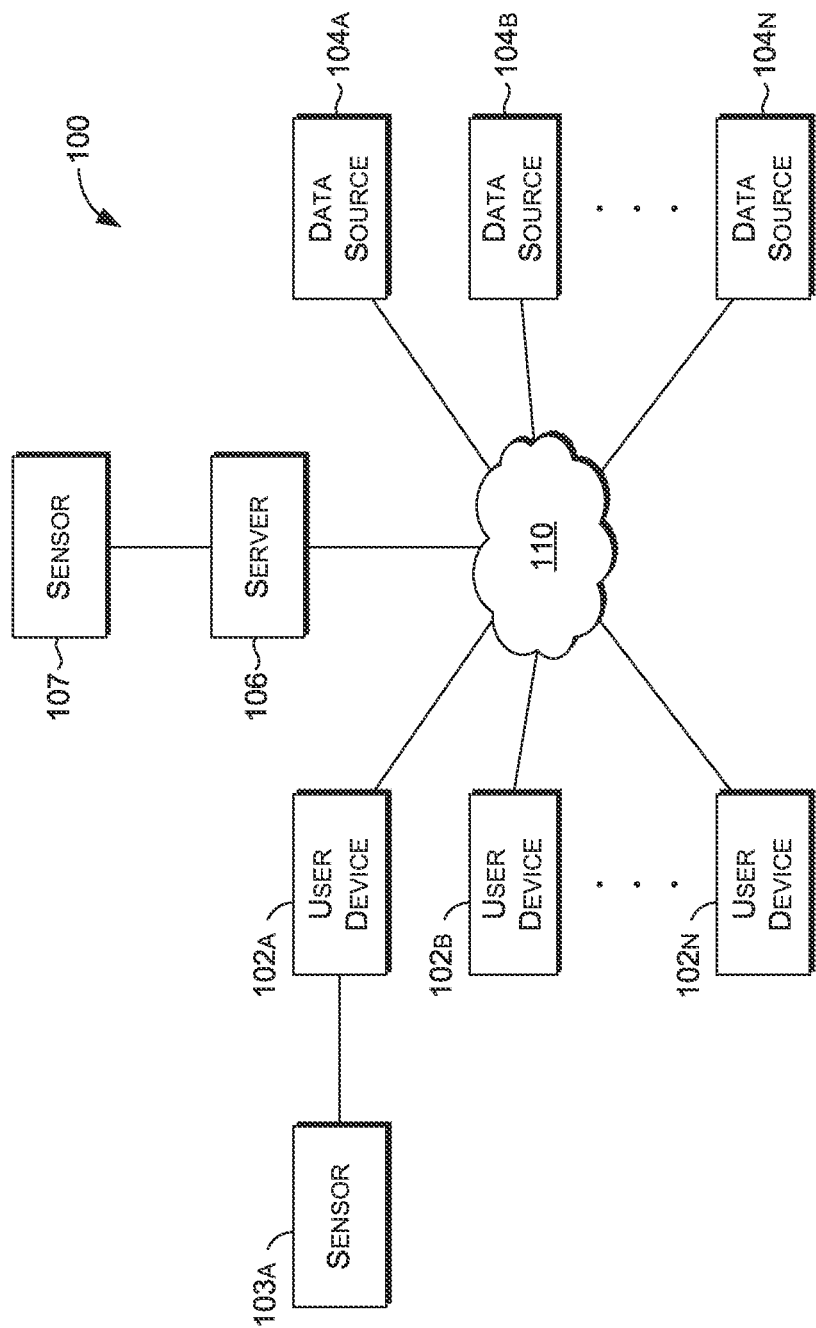
FIG. 1 is a block diagram illustrative an example operating environment suitable for implementing aspects of the disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a stand-alone application, a service or hosted service (stand-alone or in combination with another hosted service), or a plug-in to another product, to name a few.

As described herein, existing smart assistant technologies are not adequately integrated with a client application so as to execute voice utterances by causing meaningful interaction with the client application. For example, some smart assistant technologies that are used with electronic communication and/or meeting applications use push-to-talk functionality (e.g., a microphone button) to execute a user request to send a message to a communication recipient and/or meeting participant. In order to execute the user voice utterance request, these technologies render a user interface pop-up screen or other user interface element over the client application, where the user interface element contains the results for executing the request (e.g., an indication that the message has been sent). However, such user interface element is a part of the smart assistant canvas (and not part of the client application canvas). Such message is additionally not automatically inserted into any fields or pages (e.g., a chat page) of the underlying client application. For example, a conventional smart assistant may use a separate service or application to send the message, rather than using the functionality of the client application as the user intends. Such conventional techniques fail to capture the entirety of the user's tasks and/or communications, as there is no history of the message maintained by the client application. Further, these smart assistant technologies cannot cause any other client application functionality, such as adding a file to a communication, updating a draft communication or other task, intelligently switching pages, and the like. In other words, these technologies offer a "single shot" response to execute an utterance of a user over a separate user interface element that the voice assistant manages but does not cause any additional functionality of the underlying client application. This may cause the user to perform unnecessary manual user input and navigation steps at the client application, such as inputting the message into a chat field of the electronic meeting client application. This negatively affects the user experience because the user has to arduously perform these manual user inputs.

Other existing voice assistant technologies, such as those used with geolocation map services, offer shortcut functionality to take users to particular client application pages as part of executing a voice utterance request. A shortcut is indicative of a "handoff" to an application at a particular page of an application workflow. However, subsequent to the handoff, there is no other functionality that these voice assistant technologies or client applications automatically perform, and the user is left to themselves to manually finish a task. This is similar to the "single shot" problem of other voice assistant technologies described above. For example, after handoff, these technologies fail to cause an automatic population of any specific fields at the client application to help execute voice utterance requests. This likewise causes the user to perform unnecessary manual user input and navigation steps at the client application, which negatively affects the user experience because the user has to arduously put in additional information (e.g., add a stop after the next gas station) after handoff.

Existing voice assistant technologies also fail to take into account the user view context (e.g., information on a currently opened window) of particular client applications in order to determine a user intent of a voice utterance to execute the voice utterance. For example, using an email application, a user may have a window open with a populated "to" field that already includes the name "John Doe." The user may then issue a voice utterance command of, for example, "add his manager." Existing technologies may, for example, look at a predetermined user profile stored in computer memory to see who John Doe's manager is or use the context of a prior user voice utterance. However, because these technologies do not use the context of the currently opened window, they would not be able to, for example, directly cause population of the "to" field with an additional "Jane Doe" name (i.e., John Doe's manager) based on the information in the window. Moreover, providing additional user view context to determine user intent facilitates better accuracy for executing voice utterances. For example, using the illustration above, existing technologies may inaccurately execute the voice utterance "add his manager" based on a prior voice utterance that stated "send Mark a message," without recognizing that the user has moved on to a new context. Accordingly, existing technologies may predict that "his" (in the message "add his manager") is referring to Mark (and not John Doe), and therefore inaccurately return Mark's manager, instead of correctly returning John Doe's manager. Without the context of what the user is currently doing or the current view of the user, voice assistants may inaccurately determine the user's intent, leading to user frustration.

Existing voice assistant technologies also consume an unnecessary amount of computing resources, such as packet generation costs and disk I/O. As stated above, because existing voice assistant technologies are not adequately integrated with client applications, they require users to manually perform excessive input, such as exiting out of a voice assistant user interface canvas, drilling to other client application pages to complete a task associated with the voice utterance (e.g., switch to a chat window), populating fields, sending queries, and the like. In certain instances, such as with web-based applications, for these user inputs, the client application sends messages that have to repeatedly traverse a computer network, which causes excessive packet generation costs and adversely affects computer network communications. Each time a user issues a query (e.g., an HTTP request), for example, the contents or payload of the query is typically supplemented with header information or other metadata within a packet in TCP/IP and other protocol networks. Accordingly, when this functionality is multiplied by all the manual inputs needed to fully complete the voice utterance request and/or inaccurate attempts at resolving the user's intent as described above, there are throughput and latency costs by repetitively generating this data and sending it over a computer network multiple times. In like manner, there are disk I/O costs (e.g., excess physical read/write head movements on non-volatile disk) because each time a user inputs this information, such as populating various fields, the computing system often has to reach out to the storage device to perform a read or write operation, which is time consuming, error prone, and can eventually wear on components, such as a read/write head.

Existing voice assistant technologies also have difficulties with or cannot support multi-modal input (e.g., voice, touch, mouse clicks) without error and with predictability for the user. This is because conflicting inputs may be received and it may be unclear, for users, which inputs were processed. For example, a voice assistant may utter, "are you sure you want to turn on the lights?" The user may say, "yes" but then click on a user interface button that represents "no" shortly thereafter. Existing technologies attempt to solve this problem by locking the virtual assistant to a single modality. For example, using the illustration above, existing virtual assistants would lock the virtual assistant to voice by executing the "yes" request because the user started a conversational session using a voice input or first answered "yes" via a voice input. Additionally, existing virtual assistants may only listen for voice utterances since the user stated the interaction with voice and ignore other user interface modalities. The user would then not be able to perform manual user inputs for the same conversation, such as touch, clicking, and the like.

Various embodiments of the present disclosure provide one or more technical solutions to these technical problems, as well as other problems, as described herein. In operation, various embodiments of the present disclosure are directed to receiving utterance data and a user view context (e.g., the data currently displayed on a user's screen) at a first instance (e.g., page or window) of a client application. For example, at a calendaring page of a communications and/or meeting client application (e.g., MICROSOFT OUTLOOK, MICROSOFT TEAMS), the client application may first detect a voice utterance of "voice assistant . . . send Jane a chat message that I'm running late." Responsively, embodiments may automatically extract some or all of the information at the calendaring page (e.g., the user view context) since it is open on a user screen. The calendaring page may include a list of several meetings with a first meeting highlighted. Based at least in part on the utterance data and the user view context, various embodiments determine a user intent (e.g., predict what user interface task the user is trying to accomplish within the client application). For example, various embodiments may determine that because the first meeting is highlighted at the calendaring page, the user is referring to the first meeting. And because the words "chat message" are referenced in the voice utterance, the user intent is to automatically switch from the calendaring page to the chat page within the same meeting application. Moreover, embodiments can determine which "Jane" the user is referring to by, for example, walking a networking graph or other data structure and/or determining that there is a Jane already referenced on the calendaring page to map Jane with a last name and/or user identifier and send her a message.

In response to determining the user intent, various embodiments cause the client application to automatically populate data at the first instance (or another instance) of the client application, where the populating of the data is at least partially based on executing the voice utterance of the user. For example, using the illustration above, embodiments can predict that the user intent is to switch to a chat page having a private conversation thread between the user and Jane Doe and to automatically populate a message field within the chat page of "I'm running late." Consequently, some embodiments cause an automatic switch from the calendaring page to the private chat page and automatically populate a message field with the text "I'm running late" based at least in part on the user view context.

In further operation, some embodiments receive utterance data via a client application, where the utterance data corresponds to a voice utterance of a user. For example, the voice utterance may be "set an alarm for 4 p.m." Particular embodiments also receive an indication that the user has engaged manual user input at a user interface of the client application. For example, the manual user input may be a click of a user interface element, such as a drop down menu identifier indicative of setting the alarm for 4:30 p.m. instead of 4 p.m. Some embodiments may determine which modality or input was received later in time and based on this, cause a client application to respond only to the voice utterance or manual user input. For example, some embodiments determine that the manual user input was received later in time relative to the utterance data and based at least in part on this determination, cause the client application to respond only to the manual user input (and therefore refrain from responding to the voice utterance).

Various embodiments of the present disclosure improve existing voice assistant technologies because they are fully integrated with client applications so as to execute voice utterances (e.g., perform operations, requests, or carry out tasks associated with an utterance) by causing meaningful interaction with the client application. For example, instead of rendering a user interface pop-up screen or other non-intuitive user interface element that is part of a voice assistant canvas, some embodiments instead cause meaningful interactions within the native client application itself, such as causing an automatic switch of particular client application pages and causing the automatic population of specific fields within the client application. This is significantly more than the "single shot" and "handoff" solutions of existing techniques because these embodiments provide enhanced, intuitive functionality within the native client application itself. In this way, even though the voice assistant functionality may be separate functionality that uses remote services (e.g., speech-to-text services and language understanding services) relative to the client application, it is integrated within the client application such that the user experience and user interfaces have the same "look and feel" of the native client application user interfaces with which the user is familiar. Accordingly, particular embodiments of the present disclosure improve the user experience, user efficiency, and user-computer interactions, among other benefits.

In like manner, various embodiments of the present disclosure improve the user experience and user interfaces by reducing the amount of navigation, drilling, and manual input required to complete or execute a voice utterance. As described above, existing technologies that employ the "single shot" or "handoff" solutions cause the user to perform unnecessary manual user input and navigation steps at the client application, such as inputting the message into a chat field of the electronic meeting client application. This negatively affects the user experience because the user has to arduously perform these manual user inputs. However, various embodiments automatically perform these steps, such as automatically switching to a chat page and automatically populating a particular field with a payload message based on new techniques (e.g., the user view context) that no existing technologies use.

Various embodiments of the present disclosure also improve the accuracy of completing or executing voice command requests because they take into account additional context, such as user view context. Unlike existing voice assistant technologies, various embodiments take into account the user view context of particular client applications in order to determine a user intent of a voice utterance to execute the voice utterance. For example, using an email application, a user may have a window open with a populated "to" field that already includes the name "John Doe." The user may then issue a voice utterance command of, for example, "add his manager." Various embodiments would be able to, for example, directly cause population of the "to" field with an additional "Jane Doe" name (i.e., John Doe's manager) based at least in part on the information in the displayed window. Providing additional user view context to determine user intent causes better accuracy for executing voice utterances by recognizing what the user is currently doing.

Various embodiments of the present disclosure also improve computing resource consumption relative to existing technologies. Because various embodiments are adequately integrated with client applications, they do not require users to manually perform excessive input, such as exiting out of a voice assistant-controlled user interface canvas, drilling to other client application pages to complete a task associated with the voice utterance (e.g., switching to a chat window), sending queries, and the like. Rather, these embodiments do not rely on a voice assistant-controlled layer sitting on top of a client application and instead automatically provide data. Accordingly, when a TCP/IP packet, for example, traverses a network, there are reduced throughput and latency costs because less data is being sent over a computer network. In like manner, there are not as many disk I/O costs (e.g., excess physical read/write head movements on non-volatile disk) because the user does not have to keep inputting information, such as by interacting with voice assistant-controlled windows, populating various fields of the voice assistant-controlled windows, and the like. Therefore, the computing system does not have to reach out to the storage device to perform a read or write operation as many times relative to existing technologies, which reduces I/O.

Particular embodiments also improve existing voice assistant functionality because they support multi-modal input without error and with predictability for the user. This is because these embodiments use new rules that automatically process different user inputs, even when such inputs are conflicting. Some embodiments additionally visually indicate which user inputs were processed. Such visual indication or using the new rules makes it clear for users which inputs were processed. For example, using the illustration above where a voice assistant may utter, "are you sure you want to turn on the lights?" the user may say, "yes" but then click on a user interface button that represents "no" shortly thereafter. Instead of locking the virtual assistant to a single modality to execute only the "yes" request, particular embodiments determine that the "no" input was received last in time relative to the "yes" input. Based on a rule that specifies to respond to requests that were input last in time (or a rule that states to process the UI input and deactivate a microphone), particular embodiments only respond to the "no" input (and not the "yes" input). Later or last inputs for conflicting inputs are much more likely to reflect user intent, as they typically indicate a change in the user's mind. This improves natural human-computer interactions because users have better indication for which inputs are being processed and the machines that process those inputs are less likely to experience error due to the new rules that govern how inputs are processed, especially when such inputs are conflicting. Relatedly, user navigation and assistance is improved since the full spectrum of modality inputs (e.g., voice, touch, textual input, clicks) used by users can be processed instead of only one via locking functionality.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by an entity may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources (e.g., databases or other data stores), such as data sources 104a and 104b through 104n; server 106; sensors 103a and 107; and network(s) 110. It should be understood that environment 100 shown in FIG. 1 is an example of one suitable operating environment. Each of the components shown in FIG. 1 may be implemented via any type of computing device, such as computing device 1900 as described in connection to FIG. 19, for example. These components may communicate with each other via network(s) 110, which may include, without limitation, a local area network (LAN) and/or a wide area networks (WAN). In some implementations, network(s) 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n can be client devices on the client-side of operating environment 100, while server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities. In some embodiments, the one or more servers 106 represent one or more nodes in a cloud computing environment. Consistent with various embodiments, a cloud computing environment includes a network-based, distributed data processing system that provides one or more cloud computing services. Further, a cloud computing environment can include many computers, hundreds or thousands of them or more, disposed within one or more data centers and configured to share resources over the one or more network(s) 110.

In some embodiments, a user device 102a or server 106 may include one or more services configured to help execute a voice utterances of users based at least in part on user view context. For example, these service(s) may comprise: a natural language processing service to understand a voice command, a music provider service to play a song that the user has requested, a weather service to provide current weather conditions the user has requested, a news service that provides the current news the user has requested, and/or a home device activation service that causes one or more home devices (e.g., lights) to be activated in response to a user request. In various instances, each service may correspond to a particular skill supported by a voice assistant.

In some embodiments, a user device 102a or server 106 alternatively or additionally comprises one or more web servers and/or application servers to facilitate delivering web or online content to browsers installed on a user device 102b. Often the content may include static content and dynamic content. When a client application, such as a web browser, requests a website or web application via a URL or search term, the browser typically contacts a web server to request static content or the basic components of a website or web application (e.g., HTML, pages, image files, video files, and the like.). Application servers typically deliver any dynamic portions of web applications or business logic portions of web applications. Business logic can be described as functionality that manages communication between a user device and a data store (e.g., a database). Such functionality can include business rules or workflows (e.g., code that indicates conditional if/then statements, while statements, and the like to denote an order of processes).

User devices 102a and 102b through 102n may comprise any type of computing device capable of use by a user. For example, in one embodiment, user devices 102a through 102n may be the type of computing device described in relation to FIG. 19 herein. By way of example and not limitation, a user device may be embodied as a personal computer (PC), a laptop computer, a mobile phone or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable computer device.

Data sources 104a and 104b through 104n may comprise data sources and/or data systems, which are configured to make data available to any of the various constituents of operating environment 100 or system 200 described in connection to FIG. 2. Examples of data source(s) 104a through 104n may be one or more of a database, a file, data structure, or other data store. Data sources 104a and 104b through 104n may be discrete from user devices 102a and 102b through 102n and server 106 or may be incorporated and/or integrated into at least one of those components. In one embodiment, data sources 104a through 104n comprise sensors (such as sensors 103a and 107), which may be integrated into or associated with the user device(s) 102a, 102b, or 102n or server 106.

Figure 2:
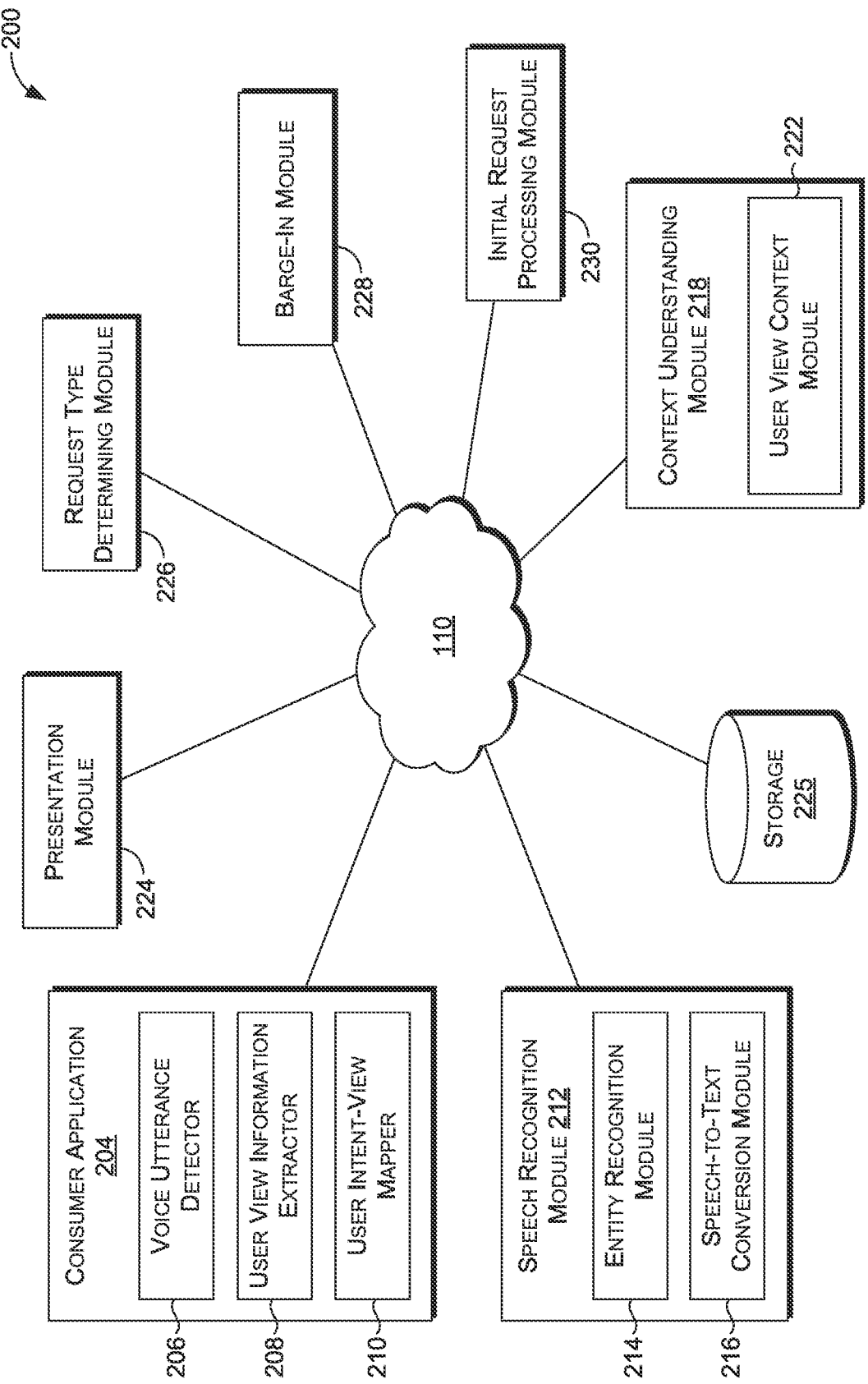
FIG. 2 is a block diagram depicting an example computing architecture suitable for implementing aspects of the disclosure.

Operating environment 100 can be utilized to implement one or more of the components of the system 200, described in FIG. 2, including components for voice-enabling applications for executing voice utterances based at least in part on user view context. Operating environment 100 also can be utilized for implementing aspects of processes 800 and 900 described in conjunction with FIGS. 8 and 9, and any other functionality as described in connection with FIGS. 2-8.

Referring now to FIG. 2, in conjunction with FIG. 1, a block diagram is provided showing aspects of an example computing system architecture suitable for implementing an embodiment of the disclosure and designated generally as the system 200. Generally, embodiments of system 200 are generally responsible for executing a voice utterance request based at least in part on user view context. Particular embodiments of the system 200 are additionally or alternatively responsible for processing multi-modal input. System 200 is not intended to be limiting and represents only one example of a suitable computing system architecture. Other arrangements and elements can be used in addition to or instead of those shown, and some elements may be omitted altogether for the sake of clarity. Further, as with operating environment 100 of FIG. 1, many of the elements described herein are functional entities that may be implemented as discrete or distributed components or in conjunction with other components, and in any suitable combination and location. For instance, the functionality of system 200 may be provided via a software as a service (SAAS) model, e.g., a cloud and/or web-based service. In other embodiments, the functionalities of system 200 may be implemented via a client/server architecture.

The system 200 includes a consumer application 204 (also referred to herein as a "client application"), a speech recognition module 212, a context understanding module 218, a presentation module 224, storage 225, a request type determining module 226, a barge-in module, and an initial request processing module 230, each of which are communicatively coupled via network(s) 110. The consumer application 204 is generally responsible for detecting one or more voice utterances of a user, extracting user view information from one or more instances of the consumer application, and automatically populating corresponding instances of the application to execute voice utterance requests (e.g., perform operations or carry out tasks associated with an utterance). The example consumer application 204 depicted in system 200 includes voice utterance detector 206, user view context information extractor 208, and the user intent-view mapper 210.

The consumer application 204 generally refers to a computer application or services, such as online/cloud applications or locally stored applications that consume or utilize the computer objects or computer resources determined by system 200. Examples of consumer applications may include, without limitation, computer applications or services for facilitating meetings or communications; email, messaging, chat, or calling; project management; and/or calendaring or scheduling. For example, suitable consumer applications may include MICROSOFT TEAMS, MICROSOFT DYNAMICS, and/or MICROSOFT OUTLOOK.

The voice utterance detector 206 is generally responsible for detecting one or more voice utterances of a user. A "voice utterance" may comprise a word (e.g., a "wake word"), phrase, sentence, command, request, and/or sound that uttered from a user. In some embodiments, the voice utterance is a key word or wake word used as authentication or authorization (e.g., key word detection) to trigger a component (e.g., an audio application programming interface (API)) to initiate a recording of audio to listen for or detect audio input. Accordingly, in response to detecting the key word, the consumer application 204 can activate a logical microphone that is configured to activate and/or encode any noise above a threshold (e.g., a certain dB level). As described in more detail below, in some embodiments, the logical microphone is activated based on a user selection of a user interface element (e.g., a mic icon), which indicates a user intent to engage in a voice assistant. Encoding as described herein refers to the manner in which data is stored and or transmitted, which typically occurs via a particular standard (e.g., FLAC, LINEAR16, AMR, or other standard). Encoding reconstructs sound using frequency response and dynamic range. Functionality that recreates frequencies is "frequency response" and functionality that creates proper loudness or noise level is "dynamic range."

In some embodiments, an audio API is the component that is triggered to activate audio listening functionality. An audio API may be a component of the consumer application 204 that processes and synthesizes audio in the consumer application 204. In some embodiments, the audio API is a web audio API that creates and processes sounds in any web application via a W3 draft standard. For example, the audio API can include audio gain controls (AGC) and echo cancellation (AEC) components that adjust microphone levels and amplify the audio to make a call clear. The audio API allows for audio quality that is near-native in execution. That is, the audio API allows for voice detection and encoding capabilities similar to devices (e.g., smart speakers) that have native voice detection and encoding functionality. Accordingly, there need not be an extreme quality tradeoff between using a particular voice assistant device and using the same functionality over the web in particular embodiments.

In an illustrative example of the voice utterance detector 206, the user can state, "voice assistant . . . invite Jane to the meeting," where "voice assistant" is the key word voice utterance and "invite Jane to the meeting" is a voice command voice utterance. In response to the detecting of the key word voice utterance, the component (e.g., an audio API) is triggered. The component may be configured to record a given voice command from a user. For example, a logical microphone or other functionality can be initiated to record or listen for sound waves. After receiving the voice command and based at least in part on the triggering of the component, the voice command of the user (e.g., "invite Jane to the meeting") is additionally or alternatively encoded. For example, when the user issues the voice command and the component is triggered, the consumer application 204 responsively encodes the voice command. Based on the encoding or receiving of the voice command, the voice command is caused to be executed at least in part. That is, in order for encoding or further processing to occur, the component (e.g., microphone) is triggered in particular embodiments. For example, the consumer application 204 can transmit the encoded voice command to a service based on triggering the component and receiving a voice command, which then fetches data from one or more services (e.g., the speech recognition module 212 and the context understanding module 218) to complete the execution of the request indicated in the voice command, as described in more detail below.

The user view information extractor 208 is generally responsible for extracting or determining a user view context of one or more instances of the consumer application 204 and/or one or more other instances of other consumer applications. An "instance" as described herein may refer to a user interface or display feature, such as a window (e.g., a pop-up window), an application page (e.g., an ANDROID activity), a tab, a dialogue box, a window pane, a button, a field, a similar user-interface element, and/or any other display feature that may be interacted with by a user. In some embodiments, an instance may hold or contain values (e.g., a name, address, date, text, or other value) or a state (e.g., on or off for a button, a setting for a dial or slider). A "user view context" as described herein refers to data within one or more instances of at least one consumer application. In some embodiments, at least one of the one or more instances are currently opened such that they are displayed on a user device screen (e.g., a pop-up window). In some embodiments, at least one of the one or more instances are additionally or alternatively running, are inactive, or have been rendered but are not visible. For example, a first page of an application can be rendered with a popup-window covering half of the first page, or a user may have navigated from a first page of the application to a second page of the application (or to a page in another application), such that the first page is now inactive or no longer visible. In these embodiments, the portion of information in the first page (which may be inactive or it may be covered by the pop-up window, the second page, or the page of a second application) may be included in a user view context even though it may not be currently visible or it is inactive. In some embodiments, the one or more instances are additionally or alternatively those instances that have been interacted with by a user within a threshold period of time (e.g., 5 minutes) or within a user session, such as a duration of relatively continuous user-activity or interaction with the user device. For example, a user view context may include information from a first page of a client application that was rendered to a user device even though it is not currently being displayed because, for instance, the first page has been closed inside of 2 minutes (e.g., the threshold at which data from a page is no longer considered user view context). A user view context can additionally or alternatively refer to an identity of an application or instance that is currently running (e.g., currently displayed or has been opened by a user but not closed out).

From the user perspective, a user view context can be any data that is currently displayed to one or more computer screens and/or any data running in the background, though it is not currently displayed. For example, an application page may have first data that is visually masked by a pop-up window. In some embodiments, the user view context includes both the data in the pop-up window and the first page. In some embodiments, the user view context includes data from different applications that are currently running in the background or are visible on a user device. In some embodiments, user view context can be contrasted with context outside of an application or instance. For example, in some embodiments, certain application pages that are not currently viewed or open or application pages that are running in the background may not include user view context. In some embodiments, any consumer application not currently opened or running does not include user view context. In some embodiments, any context obtained outside of a user device (e.g., from a server or sensor) does not include user view context. In some embodiments, the user view context information extractor 208 is configured to extract specific values from instances, such as an instance ID, which indicates an identity of a particular instance that is part of a consumer application, and further extracts fields and values of the particular instances, as described in more detail below.

The user view context information extractor 208 can extract user view context from client application instances in any suitable manner. For example, in some embodiments, the user view context information extractor 208 can perform screen scraping and/or crawling (e.g., to crawl all of the tabs in an open browser). Screen scraping is the process of extracting or copying human-readable data from a computer screen so it can be used for another purpose. Such visual data can be collected as raw text from on-screen elements such as text or images that appear on a computing device desktop, the consumer application 204 itself (or other applications), and/or a website or browser. In some embodiments, screen scraping only includes extracting the visual natural language data visible on a computer screen but not the metadata (e.g., EXIF data, such as resolution value of an image or time-stamps of when data was entered) associated with such visual data.

The user intent-view mapper 210 is generally responsible for mapping, via a data structure (e.g., a hash map), result payload values transmitted from the context understanding module 218 and/or other services in order to populate corresponding instances of the consumer application 204 to execute a voice utterance, as described in more detail below. As discussed throughout, in order to execute one or more voice utterances, various embodiments of the present disclosure, such as the consumer application 204, transmits the encoded voice utterance(s) and/or user view context over the network(s) 110. Responsively, one or more computing devices or components (e.g., the speech recognition module 212 and/or the context understanding module 218) associated with one or more services can process the voice utterance(s) and retrieve information depending on the skills supported. As described herein, a "skill" or "capability" refers to a voice assistant's specific ability category for executing voice utterances. For example, a first voice assistant skill can be playing music from a first provider, a second skill can be providing weather forecasts, a third skill can be answering questions, a fourth skill can be activating a home device (e.g., lights). Users typically define at least a portion of the skills that voice assistants execute (e.g., via paying for and inputting a skill request via an application) before the voice assistants execute a voice command. Accordingly, voice assistants do not typically execute a voice command unless the voice assistant supports a skill that can execute the voice command, or may request more information from a user if a particular skill cannot be identified.

In an example illustration of the encoded voice command being processed by one or more services, the encoded voice command can be communicated to a natural language processing (NLP) service (e.g., the context understanding module 218) that interprets the user's natural language voice command. Responsively, this service (and/or the user device) can communicate a request to another service (e.g., a music service) to help execute the voice command, which then communicates (or causes a transmission of) a payload back to the user device and/or other computing device (e.g., a web server), which enables or causes the request to be executed. In an illustrative example, a user who has opened an email web application (e.g., the consumer application 204) can issue a voice command by saying "hey voice assistant . . . bring up every email I sent between 1 p.m. and 2 p.m. yesterday." The user may be looking for a particular email. This voice command can be encoded and transmitted by the consumer application 204 to a NLP service and the web server and/or application server that hosts the web page or web application that is displayed. The web server and/or application server can then cause or enable the consumer application 204 to display the emails between 1 p.m. and 2 p.m. within the user device based on the user intent-view mapper 210, as described in more detail below.

The speech recognition module 212 is generally responsible for converting speech or audio data (e.g., detected via the voice utterance detector 206) transmitted from the consumer application 204 (or user device that includes the consumer application 204) to corresponding natural language text (e.g., via speech-to-text functionality). The speech recognition module 212 includes the entity recognition module 214 and the speech-to-text conversion module 216. The entity recognition module 214 is generally responsible for recognizing entities for speech recognition. In some embodiments, entities represent objects as determined in Named Entity Recognition (NER). In some embodiments, the speech recognition module 212 takes as input, the encoded audio detected via the voice utterance detector and produces an output of natural language text, as performed by the speech-to-text conversion module 216. Accordingly, for example, the consumer application can programmatically call or communicate with the speech recognition module 212 (and/or other service) in order to trigger the speech recognition module 212.

NER is an information extraction technique that identifies and classifying elements or "entities" in natural language into predefined categories. Such predefined categories may be indicated in corresponding tags or labels. In various embodiments, NER thus transforms unstructured data to data that is structured, and therefore machine-readable and available for processing. Entities can be, for example, names of people, specific organizations, specific locations, specific times, specific quantities, specific monetary values, specific percentages, and the like. Likewise, the corresponding tags or labels can be "people," "organizations," "location,", "time" and the like.

In an illustrative example, the user may issue a voice utterance that says "voice assistant, tell Rhonda to wait." According to various embodiments, the NER functionality can tag this item title as follows "tell [request]" "Rhonda [name]," "to[x]" "wait" [do not take further action; message payload]. In various embodiments, the [x] tags are machine-readable indicators to a computer to remove such terms for further processing (e.g., placing as inputs into a classifier or word embedding). In some embodiments, entities are indicated or determined in data structures, such as network graph or other graph structures, as described in more detail below.

The speech-to-text conversion module 216 is generally responsible for converting audio speech (e.g., processed via the entity recognition module 214) to text. In some embodiments, such functionality occurs via acoustic models and/or linguistic models. Acoustic models convert audio into small acoustic units, which are matched to sounds used daily in language. Language models convert acoustic units into words and phrases and analyze the relationships between words to determine which ones to use. In some embodiments, the speech-to-text conversion module 216 uses Gaussian Mixture Models (GMM) and/or Hidden Markov Models (HMM) to detect audio speech and convert it to text. Speech-to-text, also known as speech recognition, enables real-time transcription of audio streams into text.

In some embodiments, the speech-to-text conversion module 216 breaks down the audio of a speech recording into individual sounds, analyzes each sound, using algorithms (e.g., GMM or HMI) to find the most probable word fit in that language, and transcribes those sounds into text. In some embodiments, the speech-to-text conversion module 216 uses NLP models (e.g., GPT-3, BERT, XLNET, or other NLP model) and/or deep learning neural networks to perform its functionality. NLP is a way for computers to analyze, understand, and derive meaning from human language. This means that the speech-to-conversion module 216 breaks the speech down into bits it can interpret, converts it into a digital format, and analyzes the pieces of content.

The context understanding module 218 is generally responsible for determining or predicting user intent of a voice utterance issued by a user. "User intent" as described herein refers to one or more actions or tasks the user is trying to accomplish via the voice utterance. In some embodiments, a user intent alternatively or additionally refers to the specific user interface task the user is trying to accomplish within a client application. In some embodiments, the context understanding module 218 takes as input, the output text provided by the speech-to-text module 216 and the user view context provided via the user view context information extractor 208 and outputs the user intent. Accordingly, the speech recognition module 212 and/or the consumer application 204 can programmatically call or communicate with the context understanding module 218, which triggers the functionality of the context understanding module 218.

In some embodiments, the context understanding module 218 represents or includes one or more language understanding models or services to understand the semantic meaning (or user intent) of a voice utterance. Such understanding can include using NLP-based functionality or models, such as WORD2VEC, BERT, RoBERTa, and/or the like. For example, the context understanding module 218 can include a parsing and concatenation component that tokenizes and breaks character sequences (e.g., sentences, words, phrases, or the like) from the content and joins other character sequences (e.g., semantically similar words) and/or tags (e.g., part-of-speech) to the tokenized character sequences. In some embodiments, the joined character sequences are a part of an NLP component or library where each content is parsed into its words and some or each of the words are tagged with a part-of-speech identifier.

"Tokenization" or parsing in various embodiments corresponds to a computer-implemented process that segments the content into words, sentences, symbols, character sequence, and/or other elements of the content. "Syntax" or syntactic properties refers to the structure of character sequences of the content (as opposed to the semantics or meaning), such as the structure of a sentence. This can include a set of rules for analyzing a message, such as word and/or part of speech (POS) order. For example, for the sentence "the girl jumped happily," the syntax may correspond to a word order where the structure is subject-verb-adverb (or subject, verb, object, or a similar structure). In various embodiments, the POS of a message element is tagged.

In some embodiments, NLP derives semantic and syntactic content of semi-structured or unstructured data (e.g., data in image files, data in blogs, posts, websites, text descriptions of classifier models, or other sources of data). This is in contrast to analyzing "structured" data, such as data in a database. NLP can be configured to parse content to determine semantic context (e.g., meaning of words by analyzing each word in the content against each other and against training data) and syntax context (e.g., the set of rules that govern structure of sentences in a given language). NLP is configured to recognize keywords, contextual information, and metadata tags associated with one or more portions of a set of data. In certain embodiments, NLP analyzes summary information, keywords, text descriptions included in the set of data, and uses syntactic and semantic elements present in this information to identify semantic meaning of text. The syntactic and semantic elements can include information such as word frequency, word meanings, text font, italics, hyperlinks, proper names, noun phrases, parts-of-speech (e.g., noun, adverb, adjective, and the like), and/or the context of surrounding words. Other syntactic and semantic elements are also possible.

The context understanding module 218 includes the user view context module 222. The user view context module 222 is generally responsible for determining or predicting a user view context based on information extracted by the user view context information extractor 208. In some embodiments, a user device transmits, over the network(s) 110, the data extracted by the user view context information extractor 208 in order to, for example, determine what instances a user is currently viewing and the data that exists within those instances in order to help the context understanding module 218 determine the overall user intent. For example, if the user view context module 222 obtains information that a user currently has a window of an email application open, where the window has a "to" field populated with "John Doe" and the user has additionally issued a voice utterance that says, "add Jake to the message," the context understanding module 218 can infer that the user intent is to populate the "to" field with Jake's email based on the information in the current user view.

In some embodiments, in response to the context understanding module 218 determining user intent, it transmits, over the network(s) 110, a client action request and result payload to a user device that includes the consumer application 204 so that the consumer application 204 can responsively populate the appropriate fields and/or switch to the appropriate instances in order to execute the voice utterance request. A "client action request" is a specific request for a consumer application to populate a specific instance and/or perform some specific action with a result payload (e.g., switch pages or instances, scroll down, and the like). A "result payload" is the values that are to be returned to a client based on the voice utterance. For example, if the voice utterance is a request to send a particular message to John, then the result payload may include the actual message.

In some embodiments, the context understanding module 218 determines user intent from additional sources outside of user view contexts. For example, the context understanding module 218 can use email messages, chats, text messages from a user device, past meeting transcripts, data structures (e.g., network graphs) that show relationships between different sets of information, and the like.

The presentation module 224 is generally responsible for presenting content and related information to a user. Presentation module 224 may comprise one or more applications or services on a user device, across multiple user devices, or in the cloud. For example, in one embodiment, presentation module 224 manages the presentation of content to a user across multiple user devices associated with that user. Based on content logic, device features, associated logical hubs, inferred logical location of the user, and/or other user data, presentation module 224 may determine on which user device(s) content is presented, as well as the context of the presentation, such as how (or in what format and how much content, which can be dependent on the user device or context) it is presented and/or when it is presented. In particular, in some embodiments, presentation module 224 applies content logic to device features, associated logical hubs, inferred logical locations, or sensed user data to determine aspects of content presentation.

In some embodiments, the presentation module 224 generates user interface features associated with the consumer application 204. Such features can include interface elements (such as graphics buttons, sliders, menus, audio prompts, alerts, alarms, vibrations, pop-up windows, notification-bar or status-bar items, in-app notifications, or other similar features for interfacing with a user), queries, instances, and/or prompts.

Example system 200 also includes storage 225. Storage 225 generally stores information including data, computer instructions (e.g., software program instructions, routines, or services), data structures, and/or models used in embodiments of the technologies described herein. By way of example and not limitation, data included in storage 225, as well as any user data, may generally be referred to throughout as data. Any such data may be sensed or determined from a sensor (referred to herein as sensor data), such as location information of mobile device(s), smartphone data (such as phone state, charging data, date/time, or other information derived from a smartphone), user-activity information (for example: app usage; online activity; searches; voice data such as automatic speech recognition; activity logs; communications data including calls, texts, instant messages, and emails; website posts; other records associated with events; or other activity related information) including user activity that occurs over more than one user device, user history, session logs, application data, contacts data, record data, notification data, social-network data, news (including popular or trending items on search engines or social networks), home-sensor data, appliance data, global positioning system (GPS) data, vehicle signal data, traffic data, weather data (including forecasts), wearable device data, other user device data (which may include device settings, profiles, network connections such as Wi-Fi network data, or configuration data, data regarding the model number, firmware, or equipment, device pairings, such as where a user has a mobile phone paired with a Bluetooth headset, for example), gyroscope data, accelerometer data, other sensor data that may be sensed or otherwise detected by a sensor (or other detector) component including data derived from a sensor component associated with the user (including location, motion, orientation, position, user-access, user-activity, network-access, user-device-charging, or other data that is capable of being provided by a sensor component), data derived based on other data (for example, location data that can be derived from Wi-Fi, Cellular network, or IP address data), and nearly any other source of data that may be sensed or determined as described herein. In some respects, date or information (e.g., the requested content) may be provided in user signals. A user signal can be a feed of various data from a corresponding data source. For example, a user signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data sources. Some embodiments of storage 225 may have stored thereon computer logic (not shown) comprising the rules, conditions, associations, classification models, and other criteria to execute the functionality of any of the components, modules, analyzers, generators, and/or engines of systems 200.

Continuing with FIG. 2, the system 200 also includes the request type determining module 226. The request type determining module 226 is generally responsible for determining a type of request associated with a particular modality, manual user input, and/or client application. In some embodiments, the request type determining module 226 represents functionality that a skill service performs. And based on the type of request that is processed or expected, particular embodiments respond exclusively to either a voice utterance or manual user input. For instance, certain request types are harder to reverse or undo when they have begun to process and so particular embodiments implement rules that process such requests when they have been detected, regardless of subsequent conflicting inputs. For example, a voice assistant may issue a voice utterance that says, "are you sure you want to send this email to Victoria?" The user may speak, "yes" but then click "no" shortly thereafter at a user interface. The request type determining module 226 may determine that the request type needed to answer this question is an "email sending" request. With email sending requests, however, it may be impossible to honor the "no" input if the email has already been sent. Accordingly, the requests type delivery module 226 may query a set of rules (e.g., in storage 225) that direct which input to respond to. For example, based on the request type being an "email sending" request, there may be a rule to honor only the first received or inputted request. Accordingly, in this instance, the request processing module 230 would ignore the user's second input (i.e., the "no" input) and respond to the "yes" input only. Additionally, in some embodiments, the initial request processing module 230 can utter (or cause presentation on a user interface of) the phrase, "I've sent your email." This gives an indication to the user that the "yes" input was executed and the "no" input was not executed.

Other examples of different types of request types where the first input is honored or responded to, are transactional requests. For example, transactional requests may include clicking a button or issuing a voice utterance to pay for an item or booking functionality, such as booking a hotel or renting a car, for example. In these cases, when the transaction has passed a certain threshold in the booking or purchasing process, it is impossible to reverse subsequent and conflicting inputs. Accordingly, when particular types of requests are expected or issued, particular embodiments only execute the initial inputs and not any subsequent inputs.

The detecting of the particular request type may occur in any suitable manner. For example, a data structure (e.g., a lookup table or hash table) may list key IDs of particular request types and then corresponding rules in a same record. In this way, embodiments can match the request type IDs as passed in a request to the request ID found in the data structure and then implement the corresponding rules. For example, when a user issues a voice utterance or manual user interface request, a request type ID can be passed from the client application to one or more backend servers that host the data structure in order to implement the corresponding rules. In an illustrative example, the user may issue a voice utterance that says, "purchase item X." responsively, particular embodiments can encode the voice utterance and transmit a request ID type as, for example, "transactional request." Such ID can be run against the data structure with the same request ID and corresponding rules may be read, such as "immediately execute the request" (thereby not allowing subsequent requests to be processed). In these embodiments, client applications can have particular functionality that tags or supplements messages with transaction request type ID, which can be based on the client application itself, or the type of voice utterance or manual user input a user inputs. In this way, client applications can have their own mapping logic that maps (e.g., via NLP or lookup functionality) user inputs to request types.

The barge-in module 228 is generally responsible for executing or responding the user's last or most recent input (and refraining from executing or responding to the user's prior input(s)). This typically occurs in situations where there are multiple conflicting and simultaneous inputs, as described herein. Implementing the barge-in module presents challenges in synchronizing client and server state. Depending on network timings, for example, when the user provides the second input, the server(s) may have already processed the first input and the changed state. In an illustrative example, of the barge-in module 228, a user may issue a voice utterance that recites, "play song A by artist B" but within a threshold time (e.g., 2 seconds) click on a user interface button indicative of playing song C by artist B. Because the user interface button click occurred later in time relative to the voice utterance, particular embodiments respond to the user interface button (and not the voice utterance). Accordingly, particular embodiments return song C, as opposed to song A. Various data structures and functionality for handling conflicting modality requests are described in more detail below.

In some embodiments, the barge-in module 228 receives a request while an existing request is in progress and drops or cancels the initial request to processing the incoming or most recent request. In some embodiments, client applications do not send in multiple requests to one or more servers to execute the request. For example, if a request is in-flight to the one or more servers while a barge-in request arrives, the client application may wait for the one or more servers to respond to the first request before sending the barge-in request, even though the user may have engaged in the barge-in request well before it has been sent.

The initial request processing module 230 responds to or executes initial requests only (and not subsequent requests) based on one or more rules. For example, as described above, if a request is determined to be a transactional request type, particular embodiments affirmatively execute or respond to the first request (e.g., either via voice utterance or manual user input request). In another example, if it is determined that a voice assistant request is an "email sending" request, particular embodiments may affirmatively respond to or execute the email sending request and refrain from responding to any subsequent voice utterances or manual user interface actions.

Figure 3:
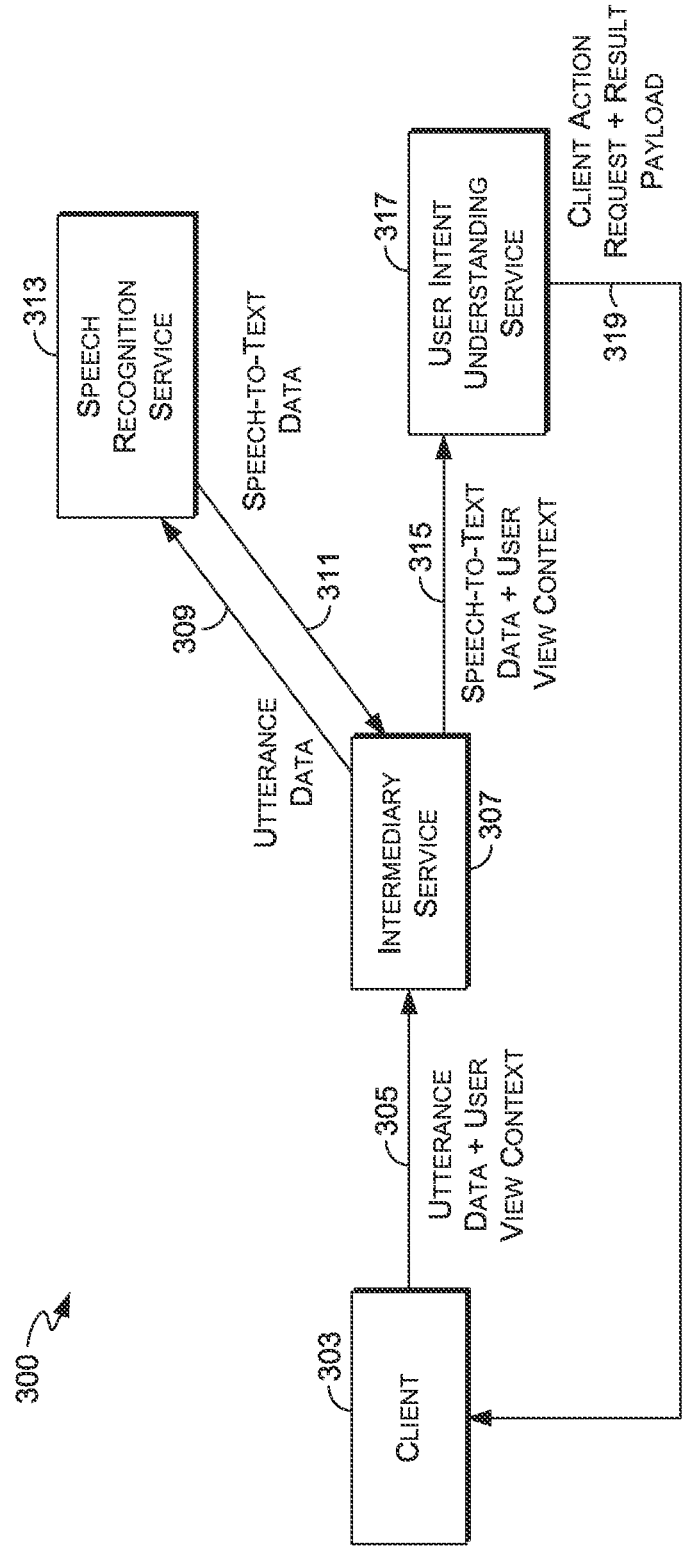
FIG. 3 is a block diagram of an example system for executing a client voice utterance request based at least in part on user view context, according to some embodiments of this disclosure.

FIG. 3 is a block diagram of an example system 300 for executing a client voice utterance request based at least in part on user view context, according to some embodiments. In some embodiments, one or more of the components of the system 300 represent or are included in particular components of the system 200 of FIG. 2. For example, in some embodiments, the client 303 is included in the consumer application 204, the speech recognition service 313 represents the speech recognition module 212, and the user intent understanding service 317 represents the context understanding module 218. Accordingly, these components may include the same functionality as described with respect to FIG. 2. In some embodiments, some or each of the components of the system 300 represents stand-alone software components, nodes (e.g., cloud computing nodes) and/or servers. For example, the client 303 may reside at a user device. The intermediary service 307 may reside at a first cloud computing node, the speech recognition service 313 may reside at a second cloud computing node, and the user intent understanding service 317 may reside at a third cloud computing node. Alternatively, in some embodiments, some or each of the components of the system 300 represent software modules that reside in the same host machine.

According to the embodiment of example system 300, the client 303 sends a request 305 to the intermediary service 307. The request 305 includes both the utterance data (e.g., an audio encoded voice utterance detected by the voice utterance detector 206) and user view context (e.g., as extracted by the user view context information extractor 208). Intermediary service 307 comprises a module or machine that can function as a central point of communication between client 303 and speech recognition service 313, as well as the user intent understanding service 317. Specifically, according to the embodiment of system 300, the intermediary service 307 forwards the utterance data 309 (included in the request 305) to the speech recognition service 313. The speech recognition service 313 takes as input the utterance data 309, and converts the audio utterance data 309 into natural language text (e.g., on a document), the output of which is referred to as speech-to-text data 311. The speech recognition service 313 then passes the speech-to-text data 311 to the intermediary service 307.

Responsively, the intermediary service 307 passes both the speech-to-text data 311 along with the user view context (included in the request 305) in a request 315 to the user intent understanding service 317 in order to determine or predict a user intent of the voice utterance associated with the speech-to-text data 311. As described above, such user intent can be determining based on using one or more NLP models to determine semantic meaning in the textual data, as well as using various sources of context (e.g., user SMS text messages, email threads, graph structures, and the like), which includes the user view context.

In response to determining or predicting the user intent, the user intent understanding service 316 generates and sends a client action request and result payload message 319 back to the client 303 to execute the request 305. Although the system 300 indicates that the user intent understanding service 317 directly sends the message 319 to the client 303, it is understood that in alternative embodiments, the user intent understanding service 317 directly sends the message 319 to the intermediary service 307 and the intermediary service 307 then forwards the message 319 to the client 303. In an illustrative example of the functionality of the user intent understanding service 317 and the message 319, based at least in part on a user device currently displaying a window of time slots for a first date and the user saying "schedule a meeting at a time that works for everyone", the user intent understanding service 317 may infer that the user's intent is to schedule a meeting on the first date for an open time slot by populating a meeting at an open time slot at the window since the window is open. Responsively, the user intent understanding service 317 may send a client action request to populate a particular field of the same window with a result payload of 3:00 p.m. to 4:00 p.m.

Figure 4A:
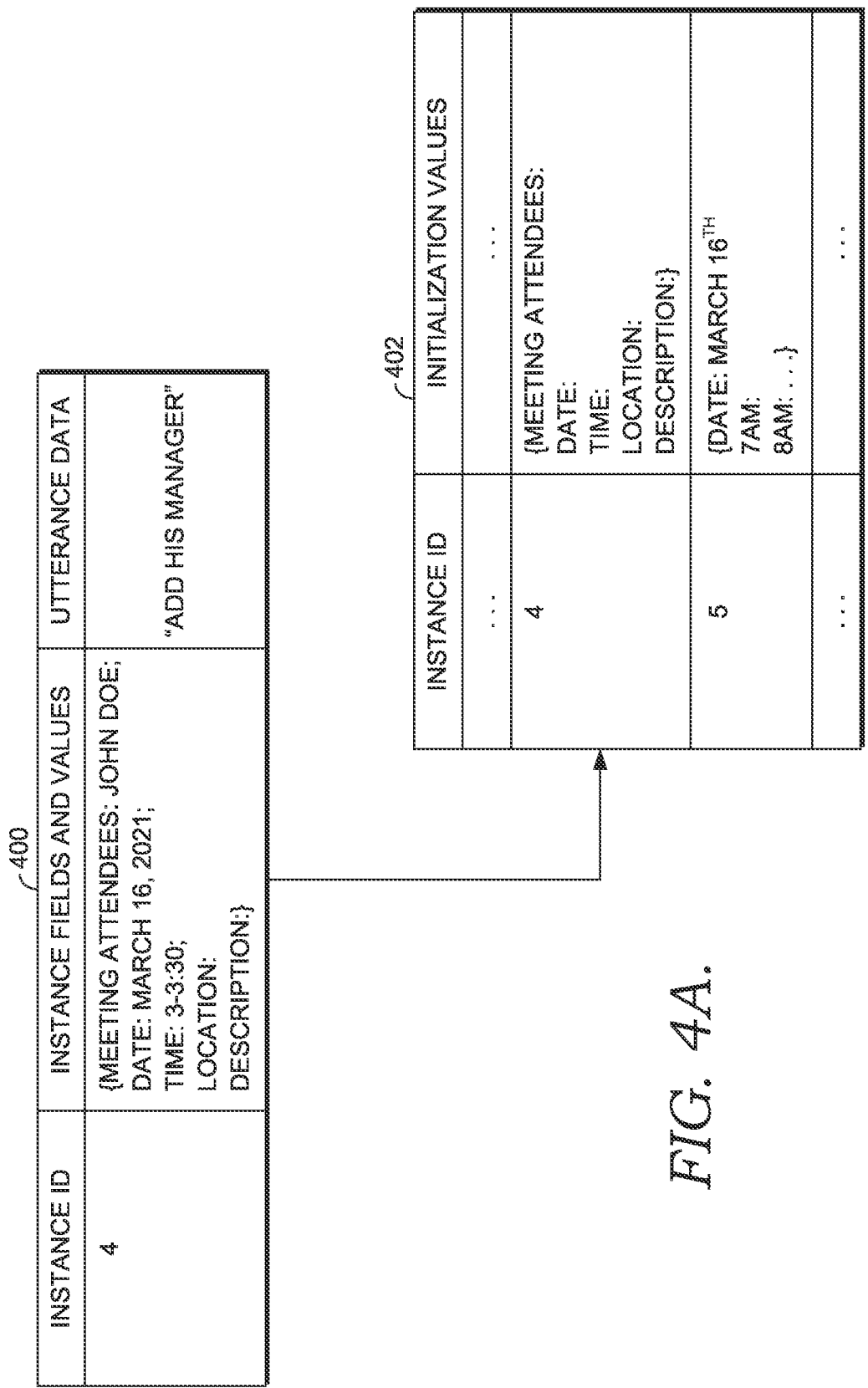
FIG. 4A is a schematic diagram illustrating how a user view context is used to initialize a data structure for predicting user intent, according to some embodiments of this disclosure.

FIG. 4A is a schematic diagram illustrating how a user view context is used to initialize a data structure for predicting user intent, according to some embodiments. In some embodiments, the table 400 includes the user view context extracted by the user view context information extractor 208 of FIG. 2 and/or the request 305 of FIG. 3. In some embodiments, the table 402 represents a data structure used by the user view context module 222 of FIG. 2 and/or the user intent understanding service of FIG. 3 to determine or predict user intent. In some embodiments, the tables 400 and/or 402 represent or include specific data structures. For example, table 402 may represent a lookup table or hash map, where the key is the instance ID and the values are the "initialization values." In this way, for example, the particular entry or record within the table 402 can be located by matching the instance ID key from the table 400 to the instance ID key in the table 402.

The table 400 represents the user view context and includes an instance ID attribute, an instance fields and values attribute, and an utterance data attribute. The instance ID attribute indicates the identity of an instance of a user view context. For example, a client application may include a workflow or particular pages or activities, each of which can be identified in successive numbers depending on the workflow (e.g., the order in which pages are drilled to). In an illustrative example, a home or landing page can be identified as instance ID 1, and a sub-page that is derived from the home or landing page can be identified as instance ID 4, and since a user currently has instance ID 4 open, it is populated under the instance ID attribute of the table 400.

The instance fields and values attribute indicates each field and already-populated values of each field for the corresponding instance. For example, the table 400 indicates that for instance ID 4, there are the fields "meeting attendees," "date," "time," "location" and "description," where the values for meeting attendees is "John Doe," the values for "date" is "Mar. 16, 2021," and the values for the time field are "3-3:30". Each of the populated fields indicate that a user has populated these fields or they have been automatically populated by the client application. In the illustrated example, the values for the "location" and "description" fields are null or empty (e.g., they have not been populated by the user). Accordingly, the table 400 indicates that the instance ID 4 is currently showing that a meeting has been set for Mar. 16, 2021 at 3-3:30 and there is already one attendee populated in the field—John Doe. The "utterance data" field indicates what the exact voice utterance was (e.g., as detected by the voice utterance detector 206). The utterance data field specifically indicates that the utterance is "Add his manager," which may be indicative of a user intent or client request to populate the "meeting attendees" field with Jane Doe as a meeting participant for an upcoming meeting, since she is "his" (i.e., John Doe's) manager.

The table 402 represents a data structure used to determine or predict user intent and includes an instance ID attribute and an initialization values attribute. The instance ID attribute of the table 402 also identifies instance IDs which may or may not be a part of the user view context. In other words, in an embodiment, the table 402 may represent a predetermined set of instances that are part of a client application (and/or other applications) and some of the fields (e.g., indicated in the initialization values) initially contain empty or null values since they have not yet received an indication of what values a user has populated. In this way, for example, the user view context module 222 has predetermined information about what instances are contained in a client application and the fields that belong to each instance so that the fields can be quickly populated with the values contained in the table 400. For example, in response to receiving the table 400, the user view context module 222 may perform a lookup function at the table 402 using the instance ID 4. Responsive to locating instance ID 4 at the table 402, the user view context module 222 can populate or initialize the corresponding fields, as indicated in the "fields and values" attribute of the table 400. For example, the "meeting attendees", "date", and "time" fields within the table 402 can be populated with the respective "John Doe", "Mar. 16, 2021", and "3-3:30" values.

Although the table 402 indicates that instance information can be predetermined, it is understood that in some embodiments, one or more instances are not predetermined. For example, user view context can include open windows, web browsers, or other client applications viewable on a screen but not part of the client application corresponding to the instance ID field of the table 402. In these embodiments, the table 404 may additionally be supplemented with or represent any data structure that copies or receives some or all of the data (including the fields) indicated in the table 400 without having pre-populated or predetermined any of the instances or fields.

Figure 4B:
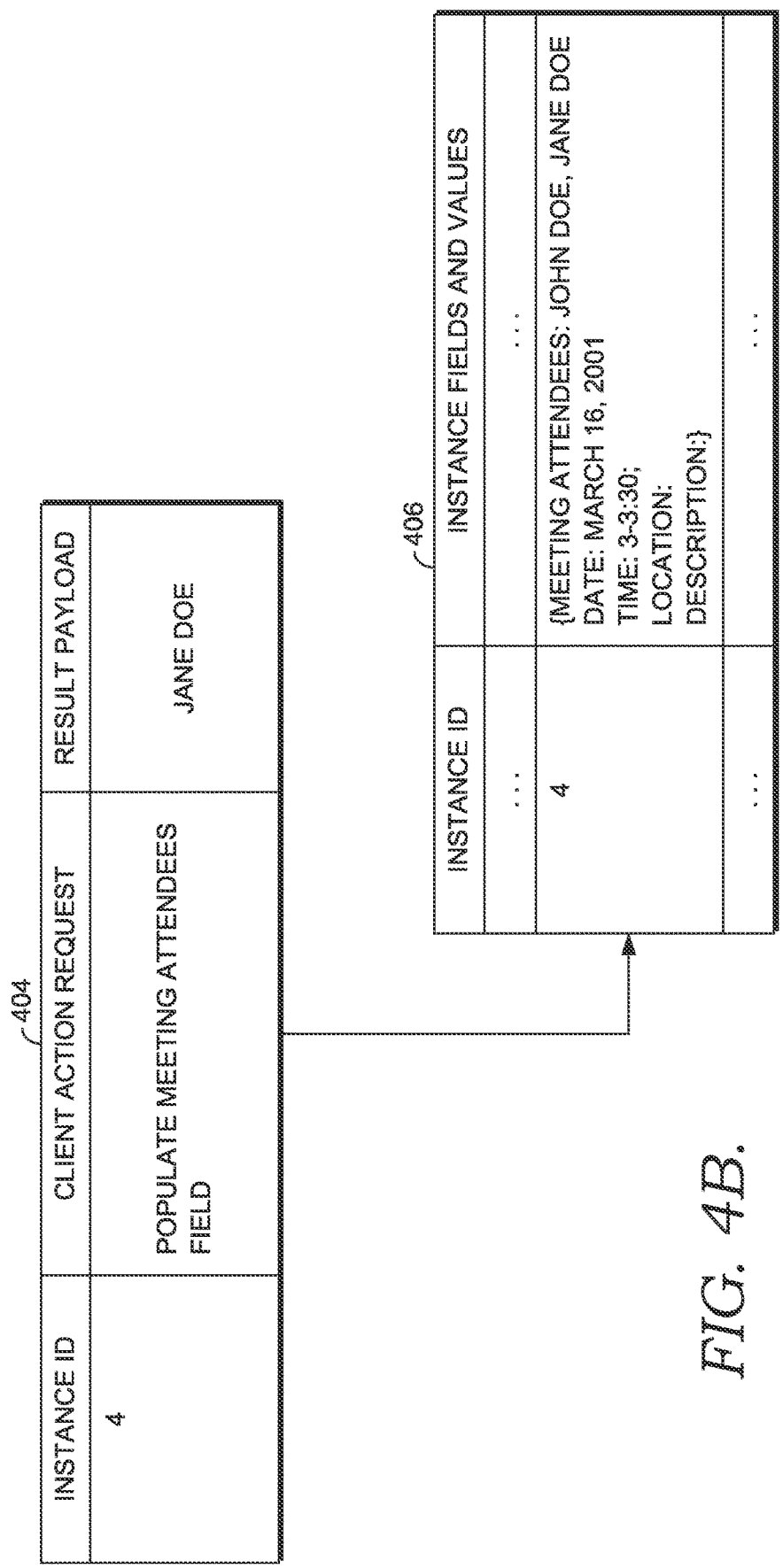
FIG. 4B is a schematic diagram illustrating how a voice utterance is executed based at least in part on user view context, according to some embodiments of this disclosure.

FIG. 4B is a schematic diagram illustrating how a voice utterance is executed based at least in part on user view context, according to some embodiments. In some embodiments, the table 404 represents the message 319 of FIG. 3 and/or functionality performed by the context understanding module 218 of FIG. 2. In some embodiments, the table 406 represents a data structure used by the user intent-view mapper 210 to execute a voice utterance by populating particular instances according to the voice utterance or user intent. In some embodiments, the functionality and structures indicated in FIG. 4B follows the functionality and structures indicated in FIG. 4A. In some embodiments, the tables 404 and/or 406 represent or include specific data structures. For example, table 406 may represent a lookup table or hash map, where the key is the instance ID and the values are the "user view fields and values" attribute. In this way, for example, the particular entry or record within the table 406 can be located by matching the instance ID key from the table 404 to the instance ID key in the table 406.

The table 404 includes an instance ID attribute, a client action request attribute, and a result payload attribute. The instance ID attribute indicates the identity of the instance for which the client action request and the result payload need to be performed. The client action request attribute is indicative of a command to the client application to perform one or more specific actions based on determining the user intent. Specifically, the client action request as indicated in the table 404 is to populate the "meeting attendees" field of instance ID 4. The "result payload" attribute indicates the specific values that are to be returned to the client application based on the client action request and the determined or predicted user intent. Specifically, the result payload is "Jane Doe." Accordingly, the table 404 may represent a message or control signal to the client application requesting the client application to populate a meeting attendee's field at instance 4 with the result payload of Jane Doe.

As described above with respect to FIG. 4A, the utterance data request may be to "add his manager", where the user is currently viewing instance ID 4, which includes the name "John Doe." Accordingly, the context understanding module 218 can determine that because the user has populated "John Doe" within the "meeting attendees" field of instance ID 4 and it is currently on the user's screen, the intent of "his" must mean "John Doe" and the word "add" must refer to a user intent to populate the "meeting attendees" field within John Doe's manager—Jane Doe (e.g., as determined via a network graph).

The information within the table 404 is passed (e.g., by the context understanding module 218) to a user device of a client application, which then responsively populates the table 406 by populating the "meeting attendees" field with the "Jane Doe" value based on the client action request and result payload indicated in the table 404. Responsive to this population, the client application causes an automatic visual rendering (e.g., within a user interface) of the "Jane Doe" value with the corresponding "meeting attendees" field indicated in the instance ID 4. Accordingly, at least partially in response to the user issuing the voice utterance request of "add his manager" while the instance ID 4 is displayed to the user's screen, "Jane Doe" can automatically be populated in the corresponding "meeting attendees" field to execute the voice utterance request of the user, which indicates that Jane Doe has been added to the meeting via the particular field already displayed on a user screen.

Figure 5:
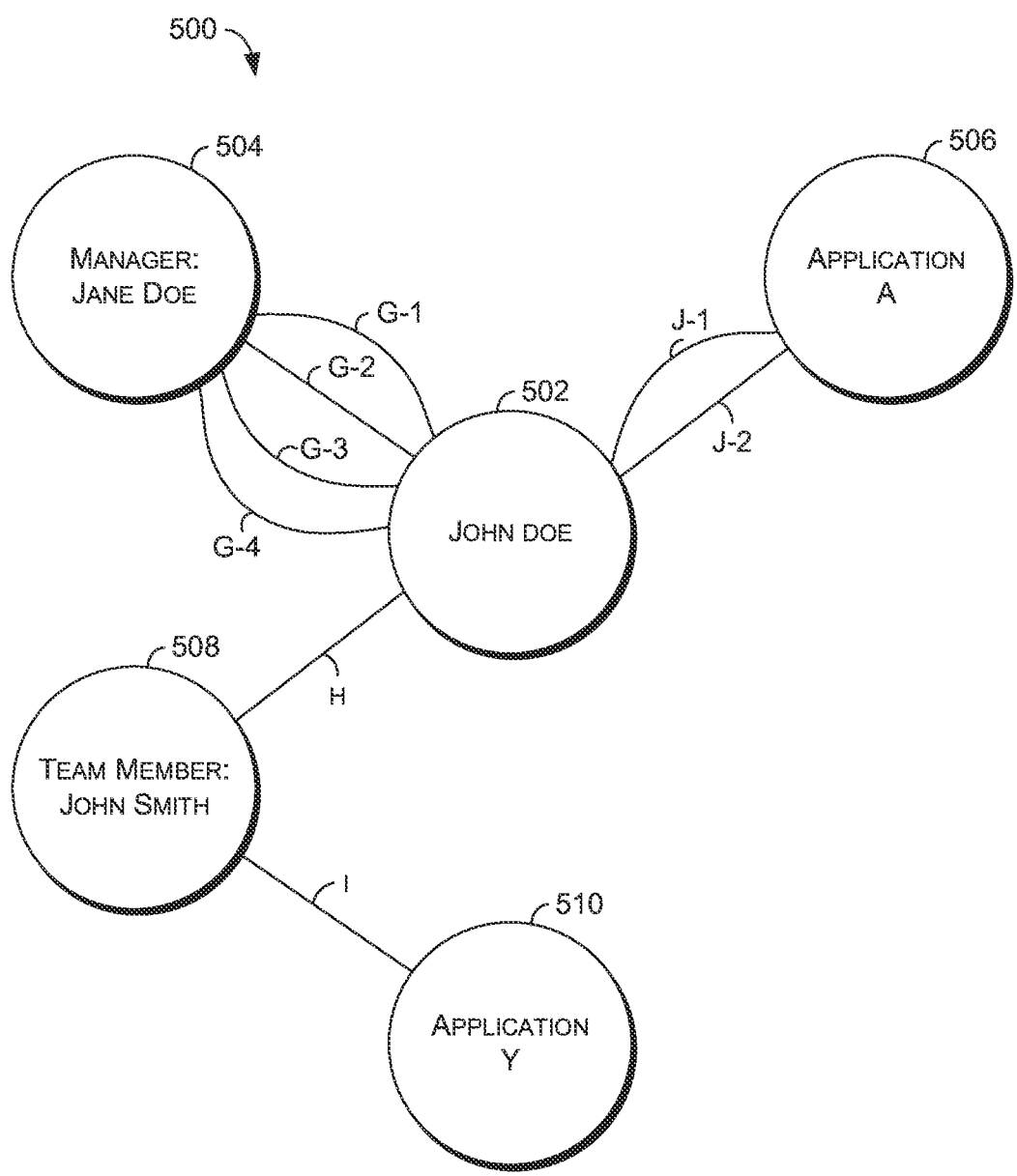
FIG. 5 is a schematic diagram of an example network graph, according to some embodiments of this disclosure.

FIG. 5 is a schematic diagram of an example network graph 500, according to some embodiments. In some embodiments, the network graph 500 is the structure used by the by the context understanding module 218 to help determine user intent and/or the entity recognition module 214 to determine entities. For example, in an embodiment network graph 500 comprises a graph database, which may be stored in storage 225 (FIG. 2) comprising a single database location or distributed storage (e.g., stored in the cloud). Alternatively or in addition, other data repositories or data structures may be utilized, such as a user profile of information about a particular user (e.g., name, contact information, manager(s), organization chart, responsibilities or permissions, or similar information about the user), or a database of data for the user (e.g., files of the user, email, meetings, calendar, user-activity history, location data, or similar information about the user, the storage of which may require the user's consent). A network graph is a pictorial representation or visualization for a set of objects where pairs of objects are connected by links or "edges." The interconnected objects are represented by points termed "vertices," and the links that connect the vertices are called "edges." Each node or vertex represents a particular position in a one-dimensional, two-dimensional, three-dimensional (or any other dimensions) space. A vertex is a point where one or more edges meet. An edge connects two vertices. Specifically, the network graph 500 (an undirected graph) includes the nodes or vertices of: 502 (representing John Doe), 504 (representing Jane Doe), 506 (representing application A), 508 (representing John Smith), and node 510 (representing application Y). The network graph 500 further includes the edges I, H, J-1, J-2, and G-1, G-2, G-3, G-4.

The network graph 500 specifically shows the relationships between various users and applications, such as client applications. It is understood that these nodes are representative only. As such, the computer resources may alternatively or additionally be calendars that users have populated, groups that users belong to, chat sessions that users have engaged in, text messages that users have sent or received, and the like. In some embodiments, the edges represent or illustrate the specific user interaction (e.g., a download, sharing, saving, modifying or any other read/write operation) with specific applications and/or the relationships between users in a business unit, for example.

Representing computer resources as vertices allow users to be linked in a manner they may not have otherwise have been. For example, application Y may represent a group container (e.g., MICROSOFT TEAMS) where electronic messages are exchanged between group members. Accordingly, the network graph 500 may illustrate which users are members of the same group. In another illustrative example, the network graph 500 may indicate that John Doe downloaded application A at a first time (represented by edge J-1), an opened it a second time (represented by edge J-2). The graph 500 may also illustrate that John Smith also downloaded or interacted with application Y, as represented by the edge I. In some embodiments, the quantity of edges represents the strength of relationship between two nodes. For example, G-1, G-2, G-3, and G-4 represent a stronger relationship between John Doe and Jane Doe than Application A to John Doe because, for example, John Doe may interact more with Jane Doe than application A. Alternatively, in some embodiments the thickness of a single edge is indicative of the degree of relationship strength. For example, instead of indicating 4 edges between nodes 502 and 504, there may be a single line between these nodes that is thicker than any other edges, indicating the strongest relationship.

In aggregate, the network graph 500 indicates that John Doe's manager is Jane Doe, that John Doe has interacted with application A, a couple of times, that John Smith is a member of John Doe's team or business unit, and that John Smith has interacted with application Y. Accordingly, the network graph 500 provides context, for example, for John Doe's closest connections in order to determine user intent. For example, in order to execute a voice utterance that says "Add John Doe's manager," some embodiments start at node 506 (because John Doe is directly referenced in the voice utterance) and then responsively "walk" the network graph 500 to locate the "manager" value at node 504. Responsively, particular embodiments then read the manager value, which is "Jane Doe" and return such value (e.g., as indicated in the result payload attribute of the table 404 of FIG. 4B). In another example, a voice utterance might be, "add John to the meeting." If John Doe issued the voice utterance (e.g., as detected by a GMM or other voice detection component), responsively embodiments can start at node 502 and then walk the network graph 500 until it finds "John Smith", which may be the only John within a threshold distance of John Doe. Accordingly, embodiments can determine that the user intent was to populate a meeting invitee field with the email of John Smith based on information within the network graph 500.

In various embodiments, the network graph 500 is used to determine user intent, such as determining the most likely candidates for who or what a voice utterance is referring to (e.g., when a user says "his" or "her" in a voice utterance, the most likely candidate are specific names). In some embodiments, for example, candidate selection is performed by selecting every person who was invited to a meeting and their N closest connections (e.g., 3 users within a particular distance threshold). In various embodiments, closeness is determined based on using distance in network graphs. In some embodiments, a "distance" in terms of network graphs corresponds to a number of edges (or edge sets) in a shortest path between vertex U and vertex V. In some embodiments, if there are multipole paths connecting two vertices, then the shortest path is considered as the distance between two vertices. Accordingly, distance can be defined as d(U,V). For instance, the distance between node 502 and node 506 is 1 (e.g., because there is only 1 edge set J between these nodes), whereas the distance between nodes 502 and 510 is 2 (e.g., because there are two different edge sets H and I between these nodes).

In some embodiments, particular candidates are alternatively selected based on distance only regardless of the actual quantity of connections (thus not being based on a "N" number of connections, as described above). For example, one or more network graph rules may specify to select all of the vertices or users as candidates that are at or within a distance of 4 of node 502. In these embodiments, all of these nodes would be selected candidates because they are at or within a distance of 4 to node 502.

Some embodiments additionally or alternatively select particular candidates by selecting the top N nodes with the most interaction (e.g., as determined by the number of edges between vertices. Some embodiments alternatively or additionally select particular candidates by selecting N users nearest to the "centroid" of at least a portion a user in the network graph 500. A "centroid" in some embodiments refers to the geometric center of a set of objects (e.g., a mean position of the nodes in the network graph 500).

Each candidate for determining user intent can be additionally filtered down to a single user or other object based on what is referenced in a voice utterance and/or other context, such as user view context. For example, if each of the nodes within the network graph 500 are selected as candidates for user intent because they are within a threshold distance of John Doe, additional processing may occur such as comparing the name "his" in the voice utterance. Accordingly, John Smith can be more semantically similar (e.g., via a Euclidian or cosine distance in a WORD2VEC or BERT model) with "his" because the closest feature vector closest to this masculine pronoun is John Smith (relative to feature vectors representing Jane Doe or the other application objects).

FIG. 6A depicts an example screenshot 602 of a user interface in connection with a voice utterance 606, according to some embodiments. In some embodiments, the screenshot 602 represents what is caused to be displayed via the presentation module 224 and/or what is part of the consumer application 204 of FIG. 2. For example, at a first time, a user 604 issues a voice utterance 606 comprising "send a chat message to Jaclyn that I am running late." In some embodiments, in response to receiving an indication that the user has selected the push-to-talk microphone button 607, an audio API embedded into the corresponding application activates so as to pick up audio of the user's utterance. Subsequently, the user issues the voice utterance 606. Alternatively, in some embodiments, the user 604 can issue a wake word voice utterance in order to trigger the audio API.

In some embodiments, in response to this detection of the voice utterance 606, various components described herein perform their functionality in order to execute the voice utterance 606. For example, in response to detecting the voice utterance 606, a user view context information extractor 208 can extract some or all of the information of the screenshot 602 (e.g., the "calendar" text, the "March 15th text", the instance ID of the screenshot 602, and additional metadata, such as the particular application (e.g., MICROSOFT TEAMS) ID that the instance ID belongs to, or other application pages that may have been recently presented to the user or interacted with by the user in this session, as described herein. Responsively, the consumer application 204 can encode and communicate the voice utterance 606 to the speech recognition module 212, as well as the user view context (e.g., the information included in the screenshot 602) to the context understanding module 218 in order to recognize or understand the speech of the voice utterance 606 and determine or infer the user intent. Based on having detecting the speech, in some embodiments, the indicia 609 is provided to the screenshot 602. Based on determining, detecting, or predicting user intent of the user 604, particular embodiments cause display of the screenshot 608 and the corresponding information within FIG. 6B.

FIG. 6B depicts an example screenshot 608 of a user interface that is provided in order to execute the voice utterance 606 of FIG. 6A. In some embodiments, screenshots 608 and 602 are mobile pages or activities that are part of a single consumer application 204 (e.g., a communications or electronic meeting application that is stored to (or operates on) a single user device). For instance, in an example session, a user may start off within a calendar view (e.g., screenshot 602) of the consumer application 204, and based on executing or processing the voice utterance 606, the user may automatically be navigated to a messaging or email view (e.g., screenshot 608) of the consumer application 204. (Although screenshot 608 depicts a chat messaging view, another embodiment (not shown) having screenshots 602 and 608 within a communications application such as MICROSOFT OUTLOOK could instead depict an email view as screenshot 608.) In a similar way, some embodiments of the voice assistant technology described herein can identify and facilitate user interaction with different modes of the consumer application 204, such as transitioning from an activity like "identify recipients" in a send email task to an action like "dictation" for a compose email body task. In other embodiments, screenshots 608 and 602 are from separate applications and demonstrate cross-application (or cross-domain) functionality by allowing a user to utilize a second application (e.g., the application of screenshot 608) to complete a task initiated within a first application (e.g., the application of screenshot 602), as further described herein. For instance, such functionality allows a user to send a message via MICROSOFT TEAMS (i.e., the second application) from the MICROSOFT OUTLOOK calendar (i.e., first application), as described below As illustrated in FIG. 6B, the message "I am running late" is automatically populated in the field 610 in response to processing the voice utterance 606. Accordingly, in some embodiments, executing the voice utterance 606 (or processing the voice utterance 606 by context understanding module 218, as described herein) causes the screenshot 602 to automatically change to the screenshot 608, which may be the same application, and further automatically cause the field 610 to be populated based on determining or predicting the user intent. For example, referring back to FIG. 4B, some embodiments can receive a table similar to the table 404 indicating that the instance 606 (that has a particular ID) is part of a specific electronic meeting application. Some embodiments (e.g., the context understanding module 218) can further map the word "chat message" in the voice utterance 606 with another instance ID (e.g., a separate chat page 608) located in the table 406 (e.g., via feature vector distance being within a threshold between "chat message" and a name of the instance ID as indicated in the table 406) and additionally map the result payload value (i.e., "I am running late") to the particular field 610 since this is how users might send messages in the chat screenshot 608. Some embodiments can further map the word Jaclyn (e.g., via the network graph 500, described herein) to the particular person, "Jaclyn Smith." Accordingly, based at least in part on some or all of this combined information, some embodiments can predict that the user intent is to change pages from page 602 to 608 (a chat page) and populate the field 610 with the result payload.

Some embodiments of the voice assistant technology described herein provide flexible modalities by which a user can accomplish a task. For example, in some embodiments, users can modify (e.g., add, delete or supplement) these automatic populations of fields or otherwise manually provide inputs in addition to or alternative to providing a voice utterance. For instance, in the example screenshots 6B and 7A though 7H, a user could also manually manipulate the user interface to add a meeting attendee (or remove an automatically-provided meeting attendee), change a meeting time, modify a message, and the like. In these embodiments, voice assistant functionality has real time (or near real-time) visibility into these changes that the user makes, and can subsequently facilitate further actions via user voice commands. For example, a user can manually input a meeting attendee into a field on a page. Embodiments can determine a user view context based on these modifications, such as the manually-entered meeting attendee at the page, and subsequently execute a voice utterance, as described herein.

In some instances, these differing modalities are conflicting or are input simultaneously. Particular embodiments incorporate new rules to handle these situations as described herein. For instance, the user 604 can additionally or alternatively perform manual user input at the field 610, such as typing the string, "I should be on time," which is a conflicting input. In these embodiments, components, such as those described with respect to the request type determining module 226, the barge-in module 228, and/or the initial request processing module 230, as described with respect to FIG. 2 can perform its functionality. For example, such manual user input request may be considered a "barge-in" request or simply an indication that a user has engaged in manual user input. Consequently, because such manual user input was received during a conversation or later in time relative to the voice utterance 606 (or received at all), particular embodiments refrain from responding to or executing the voice utterance 606 and instead respond or execute the manual user input such that the string "I should be on time" is caused to be displayed instead of "I am running late." In other words, the voice utterance request to send a chat message to Jaclyn is canceled to allow the user to perform their own manual user input.

As described above, in some embodiments, FIG. 6B represents functionality where voice assistant functionality can enable cross-application or cross-domain scenarios. For example, FIG. 6A may represent a calendaring page of a calendaring application and FIG. 6B may represent a chat page of an entirely different electronic meeting application. For instance, these embodiments can allow a user to make a MICROSOFT TEAMS call or chat session from MICROSOFT OUTLOOK, or similarly, send an email (which may be performed utilizing a second application) to a group of attendees listed on a meeting invite (which may be provided to the user via a first application or a second instance of the second application).

In some embodiments, in response to receiving an indication that the user 604 has selected the send button 612 (or issued a voice command to "send it" or the like), embodiments then cause the chat message "I am running late" to be displayed underneath the chat message 614. Alternatively, some embodiments automatically cause the chat message "I am running late" to be sent and displayed underneath the chat message 614 (i.e., without need of any indication that the user has selected the button 612).

Figures 7A, 7B:
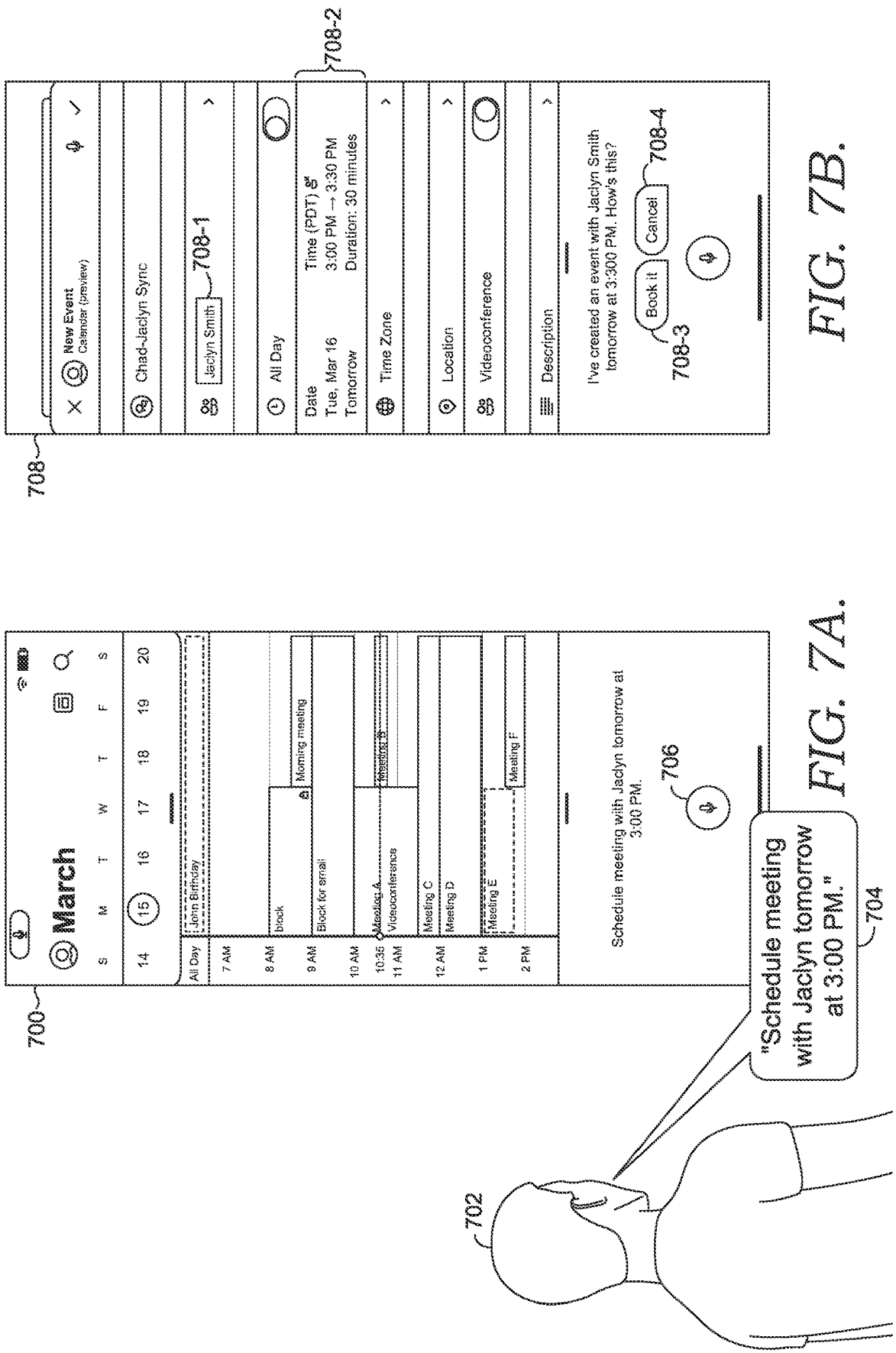
FIGS. 7A-7H are screenshots or pages of a user interface in connection with various voice utterances, according to some embodiments of this disclosure.

FIG. 7A depicts an example screenshot 700 of a user interface in connection with a voice utterance 704, according to some embodiments. In some embodiments, the screenshot 700 represents what is caused to be displayed via the presentation module 226 and/or what is part of the consumer application 204 of FIG. 2. For example, at a first time, a user 702 issues a voice utterance 704, "schedule meeting with Jaclyn tomorrow at 3:00 p.m." In some embodiments, in response to receiving an indication that the user has selected the push-to-talk microphone button 706, an audio API embedded into the corresponding application activates so as to pick up audio. Subsequently, the user issues the voice utterance 704. Alternatively, in some embodiments, the user 702 can issue a wake word voice utterance in order to trigger the audio API.

In some embodiments, in response to this detection of the voice utterance 704, various components described herein perform their functionality in order to execute the voice utterance 704. For example, in response to detecting the voice utterance 704, the user view context information extractor 208 can extract all of the information at the screenshot 700 (e.g., the "March 15$^{th}$" date and all of the time slot information and time availabilities). Responsively, the consumer application 204 can encode and transmit the voice utterance 704 to the speech recognition module 212, as well as the user view context (e.g., the information included in the screenshot 700) to the context understanding module 218 in order to recognize the speech and determine or predict the user intent. And based on determining, detecting, or predicting user intent of the user 702, particular embodiments cause display of the screenshot 708 and the corresponding information within FIG. 7B.

FIG. 7B depicts an example screenshot 708 of a user interface that is provided in order to execute the voice utterance 704 of FIG. 7A. In some embodiments, a title of a meeting, description of the meeting, or other meeting information is automatically determined and displayed (e.g., based on user intent and/or user view context, such as meeting attendees indicated on the screenshot 708. In some embodiments, screenshots 700 and 708 are mobile pages or activities that are part of a calendaring or email application that is stored to a single user device. As illustrated in FIG. 7B, the additional information of "Jaclyn Smith" is populated to the field 708-1 and the time information is stored to the field 708-2 (including the "Mar 16$^{th}$" date) in order to execute the voice utterance 704 of FIG. 7A. The field 708-1 may be indicative of a meeting attendee field where users can specify meeting attendees to be invited to a meeting. Accordingly, some embodiments, such as the context understanding module 218 causes the screenshot 700 to automatically change to the screenshot 708 of the same application and further automatically causes the fields 708-2 and 708-1 to be populated. For example, referring back to FIG. 4B, embodiments can receive a table similar to the table 404 indicating that the instance 700 (that has a particular ID) is part of a specific calendaring application. Embodiments (e.g., the context understanding module 218) can further map the words "schedule a meeting" in the voice utterance 708 with another instance ID (e.g., a separate meeting scheduling page) located in the table 406 (e.g., via feature vector distance being within a threshold between "schedule a meeting" and a name of the instance ID as "meeting scheduling page") and additionally map the word "tomorrow" in the voice utterance 704 to March 16$^{th}$ based on the user view context which reads "March 15$^{th}$". Embodiments can also ensure that 3:00 p.m. is indeed open for a meeting based on the user view context of the screenshot 700 and/or other user availability information. Based at least in part on some or all of this combined information, embodiments can predict that the user intent is to change from page 700 to page 708 and responsively populate the fields 708-1 and 708-2 with the corresponding information and then automatically cause population of these fields.

In some embodiments, in response to receiving an indication that the user 702 has selected the "book it" button 708-3 (or issued a similar or corresponding voice command), various embodiments finalize the scheduling of the meeting. Conversely, in response to receiving an indication that the user has selected the "cancel" button 708-4 (or issued a similar or corresponding voice command), various embodiments automatically erase the data from the fields 708-1 and 708-2 and/or automatically return the user to the page 700 of FIG. 7A. In these embodiments, components, such as those described with respect to the request type determining module 226, the barge-in module 228, and/or the initial request processing module 230, as described with respect to FIG. 2 can perform its functionality. For example, such manual user input request may be considered a "barge-in" request or simply an indication that a user has engaged in manual user input. Consequently, because such manual user input was received during a conversation or later in time relative to the voice utterance 703 (or received at all), particular embodiments refrain from responding to or executing the voice utterance 703 and instead respond or execute the manual user input of the cancel button 708-4 in order to refrain from responding to the voice utterance 703.

Figure 7D:
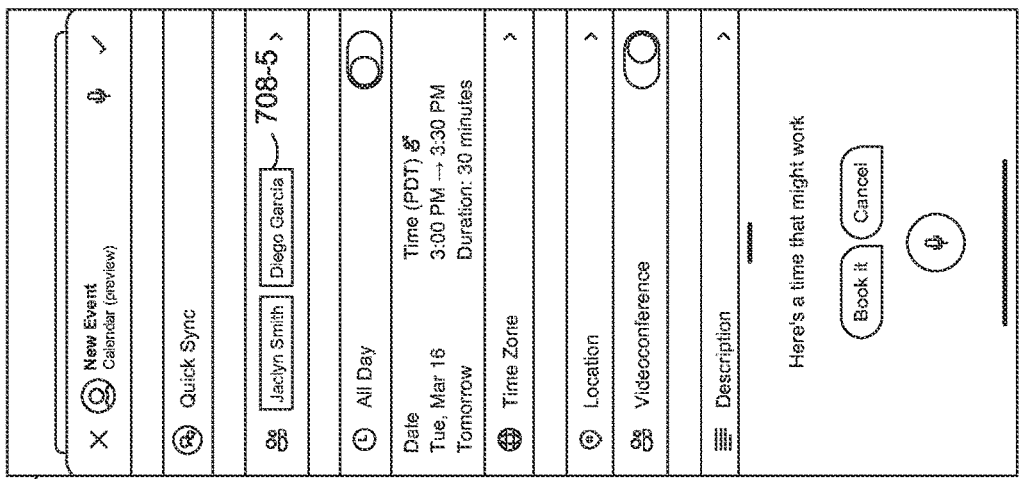
Figure 7C:
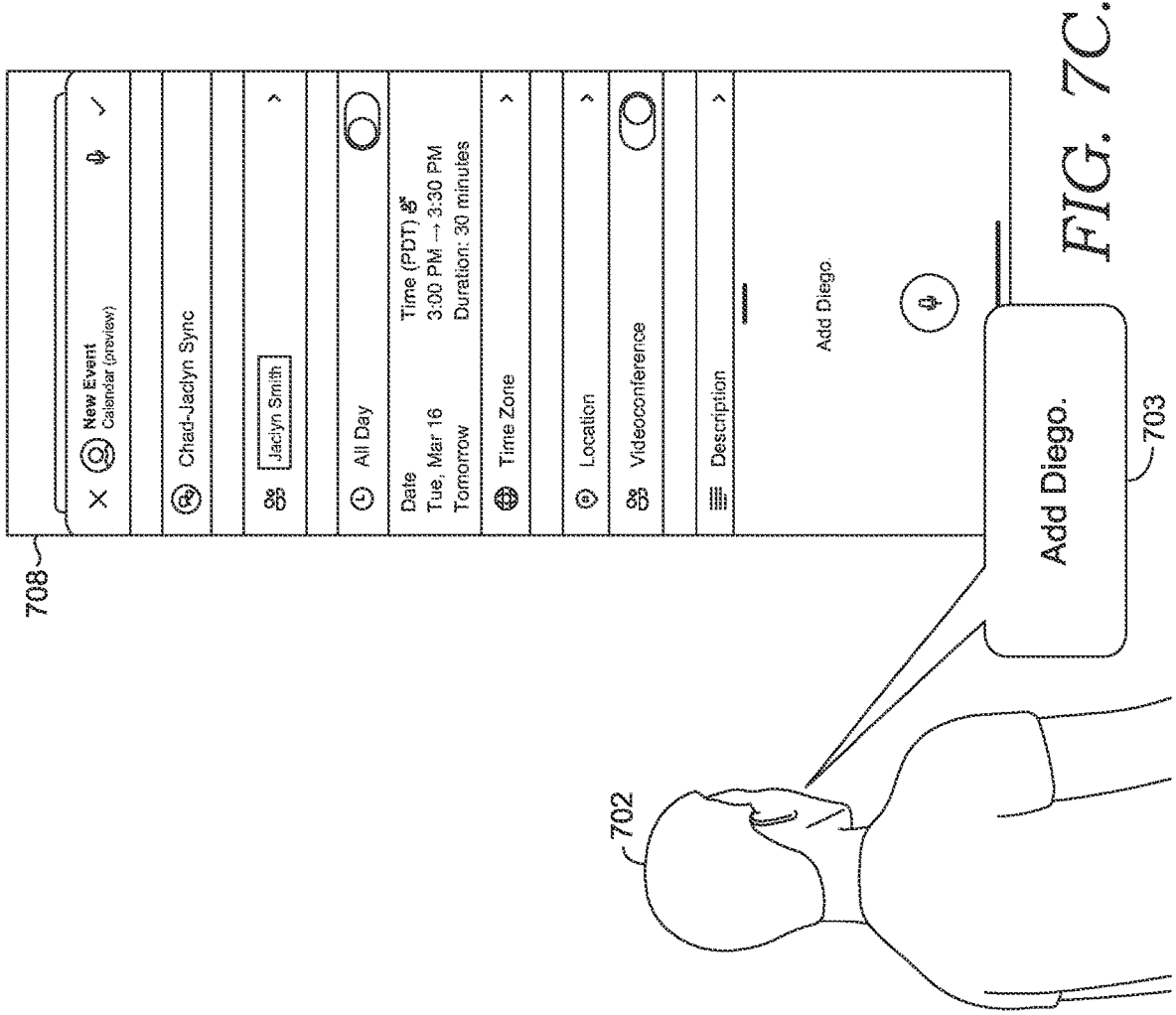

FIG. 7C depicts the screenshot 708 of FIG. 7B, except the user 702 has issued an additional voice utterance 703, according to some embodiments. The user 702 may desire to invite additional people to the same meeting the user scheduled at FIG. 7B. Accordingly, the user may issue the voice utterance 703, which states "add Diego". As described herein, various embodiments can then detect the voice utterance 703, extract user view context from the page 708, perform speech recognition and determine user intent in order to populate the field 708-5 of FIG. 7D. For example, the context understanding module 218 can map the word "add" to the action of "populate the field 708-5" with the value of "Diego" since Diego was indicated in the voice utterance 703. Such mapping can be based on the field 708-1 having just been populated and the word "Jaclyn Smith" on the page 708. For example, embodiments can walk a network graph of Jaclyn Smith and here closest connection can be "Diego Garcia." In this way, embodiments know which Diego the voice utterance 703 is referring to and can also responsively determine the email address of Diego Garcia in order to invite Diego to the meeting. In some embodiments, a title of the meeting, a description of the meeting, or other meeting information can be determined, updated or displayed (e.g., based on the new user intent and/or user view context, such as indicated from a new meeting attendee).

Figures 7E, 7F:
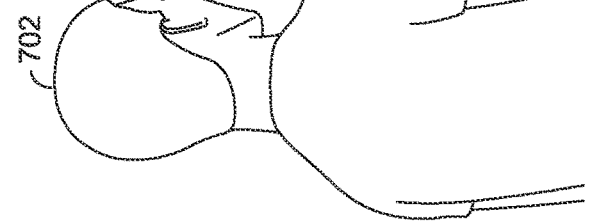

FIG. 7E depicts the screenshot 708 of FIG. 7D, except the user 702 has issued an additional voice utterance 705, according to some embodiments. The user 702 may desire to invite additional people to the same meeting the user scheduled at FIG. 7B. Accordingly, the user may issue the voice utterance 705, which states "include his manager too." As described herein, various embodiments can then detect the voice utterance 705, extract user view context from the page 708, perform speech recognition and determine user intent in order to populate the field 708-6 of FIG. 7F. For example, the context understanding module 218 can map the word "include" to the action of "populate the field 708-6" and map the word "his" with the value of "Diego Garcia" since Diego was included in the most recent command and is indicated in the user view context of FIG. 7E. Such mapping can be based on the field 708-5 having just been populated. Additionally, particular embodiments map the word "manager" to "Patricia Johnson". For example, embodiments can walk a network graph of Diego Garcia and his closest connection or node labeled "manager" can be "Patricia Johnson." In this way, embodiments determine who the manager of Diego Garcia is and can also responsively determine the email address of Patricia Johnson in order to invite her to the meeting.

Figures 7G, 7H:
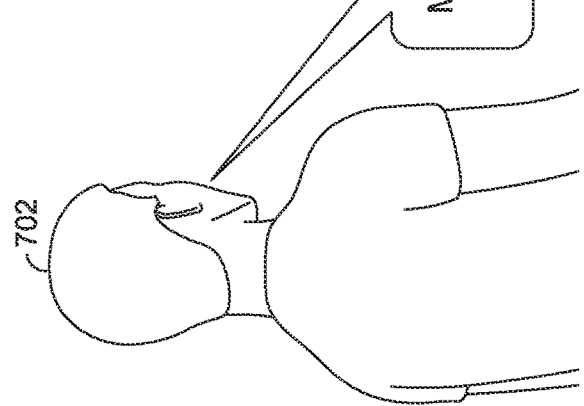

FIG. 7G depicts the screenshot 708 of FIG. 7F, except the user 702 has issued an additional voice utterance 707, according to some embodiments. The user 702 may desire to change the meeting time the user scheduled at FIG. 7B.

Accordingly, the user may issue the voice utterance 707, which states "move it to 4:00 p.m. on Wednesday". As described herein, various embodiments can then detect the voice utterance 707, extract user view context from the page 708, perform speech recognition and determine user intent in order to populate the field 708-7 of FIG. 7H. For example, the context understanding module 218 can map the words "move it" in the voice utterance 707 to changing or populating the field 708-7 with a new time since the user currently has open the page 708 of FIG. 7G. Additionally, embodiments can map the word "Wednesday" the next day of Wednesday March $17^{th}$ based on the page 708 that is currently open on page 708 reading "Tue, March $16^{th}$". In other words, the user intent can be to stay on the same page 708 and change the meeting time to Wednesday March $17^{th}$ at the field 708-1 based on the voice utterance 707 and the data contained in the user view context of the page 708 of FIG. 7G.

Figure 8:
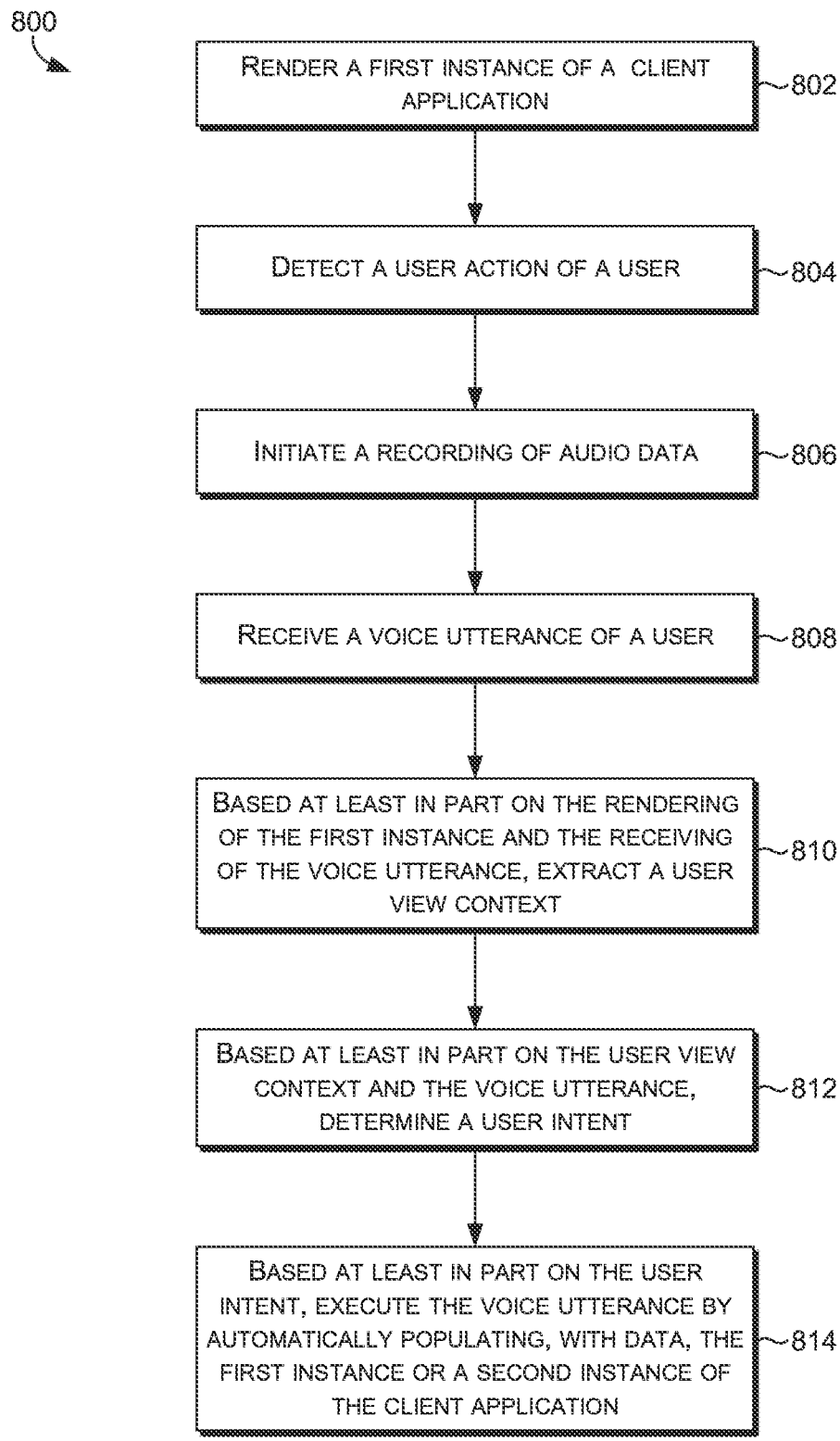
FIG. 8 depicts an example process flow for executing a voice command of a user by populating specific instances of a client application, according to some embodiments of this disclosure.
Figure 9:
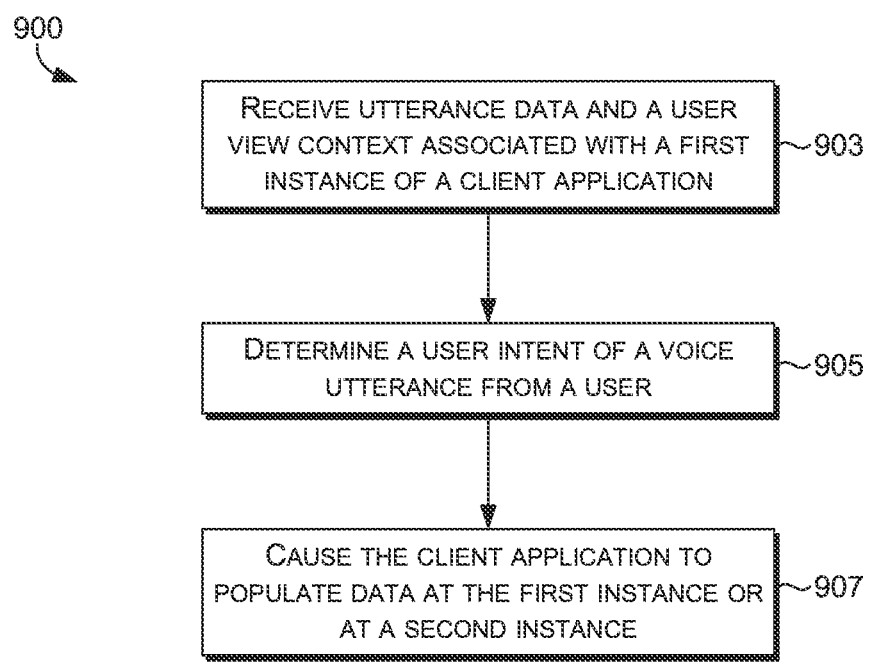
FIG. 9 depicts an example process flow for causing a client application to execute a voice utterance by determining user intent, according to some embodiments of this disclosure.

Turning now to FIGS. 8 and 9, aspects of example processes 800 and 900 are illustratively depicted for embodiments of the disclosure. Processes 800 and 900 each may comprise a method (sometimes referred to herein as method 800 and method 900) that may be carried out to implement many of the example embodiments described herein. With reference to FIG. 8, example process 800 provides a method for executing a voice command of a user by populating specific instances of a client application, according to some embodiments. The process 800 (and/or any of the functionality described herein (e.g., example process 900)) may be performed by processing logic that comprises hardware (e.g., circuitry, dedicated logic, programmable logic, microcode, and the like), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Such added blocks may include blocks that embody any functionality described herein. The computer-implemented method, the system (that includes at least one computing device having at least one processor and at least one computer readable storage medium), and/or the computer program product as described herein may perform or be caused to perform the processes 800 and/or 900 or any other functionality described herein.

In some embodiments, the process 800 is performed by a user device (e.g., user device 102a, of FIG. 1) or consumer application (e.g., consumer application 204 of FIG. 2). At block 802, process 800 renders (e.g., displays) a first instance of a client application. For example, referring back to FIG. 7A, a client application can render the screenshot 700. At block 804, particular embodiments of process 800 detect a user action of a user. In some embodiments, such user action comprises a manual user computer input such as a click of a button (e.g., a push-to-talk button, as illustrated by the button 706 of FIG. 7A). Alternatively, in some embodiments, such user action is a voice utterance, such as a "wake word."

At block 806, some embodiments initiate a recording of audio data. For example, in response to the detecting operation performed at block 804, some embodiments trigger a component that is configured to record audio data. Additional examples and details of embodiments of block 806 are provided in connection to the voice utterance detector 206 in FIG. 2 (e.g., an audio API is activated to listen for audio or voice utterances). At block 808, some embodiments receive a voice utterance of a user. For example, referring back to FIG. 7A, the client application can receive the voice utterance 704. Some embodiments additionally encode the first voice utterance based at least in part on the triggering of the component as described, for example, with respect to the voice utterance detector 206 of FIG. 2.

At block 810, embodiments of example process 800 extract a user view context based at least in part on the rendering of the first instance and the receiving of the voice utterance. Additional example embodiments of operations that may be performed at block 810 are provided in connection to user view context information extractor 208 in FIG. 2. At block 812, embodiments of example process 800 determine a user intent based at least in part on the user view context and the voice utterance. In some embodiments, block 812 includes communicating or transmitting (e.g., by the client 303), or causing transmission of, the user view context and the voice utterance (e.g., to the intermediary service 307, the speech recognition service 313, and/or user intent understanding service 317) in order to determine a user intent. Example embodiments of operations that may be performed at block 812 are described in connection with FIG. 2 and FIG. 3. For instance, referring to FIG. 2, the user device hosting the consumer application 204 (i.e., a client application) can transmit the user view context and the detected voice utterance to the speech recognition module 212 and the context understanding module 218 in order to determine an intent of the voice utterance.

At block 814, based at least in part on the user intent (and/or the transmitting at block 812), some embodiments execute the voice utterance by automatically populating, with data, the first instance or a second instance. Example embodiments of operations that may be performed at block 814 are described with respect to FIGS. 6A through 7H, where specific pages may be rendered to a user and specific fields of values are populated.

Turning now to FIG. 9, a flow diagram is provided illustrating example process 900 for causing a client application to execute a voice utterance by determining user intent, according to some embodiments of this disclosure. In some embodiments, the process 900 is performed by the context understanding module 218 of FIG. 2. At block 903, embodiments of example process 900 receive utterance data and a user view context associated with a first instance of a client application. Example embodiments of operations that may be performed at block 903 are further described with respect to the context understanding module 218 of FIG. 2 and the user intent understanding service 317 of FIG. 3. In some embodiments, "utterance data" can be the speech-to-text data indicated in the message 315 (FIG. 3). Further, the user view context may include data from the first instance of the client application (e.g., that is open on a user device) associated with a user.

At block 905, embodiments of process 900 determine a user intent of a voice utterance from a user. The determination may be based at least in part on the utterance data and the user view context. Example embodiments of operations performed at block 905 are further described with respect to the user view context module 222 of FIG. 2 and FIGS. 6A through 7H.

At block 907, embodiments of process 900 cause the client application to automatically populate data at the first instance or a second instance. In some embodiments, operations performed at block 907 may be in response to determining the user intent from block 905. The populating of the data can be at least partially indicative of executing the voice utterance. Example embodiments of operations performed at block 907 are further described with respect to the message 319 of FIG. 3 or FIGS. 6A through 7H (e.g., FIG. 7B). In some embodiments, block 907 (and/or block 814 of FIG. 8) further includes facilitating interaction with different application modes, e.g., transitioning from an activity like "identify recipients" in a send email task to an action like "dictation" for a compose email body task.

Figure 10:
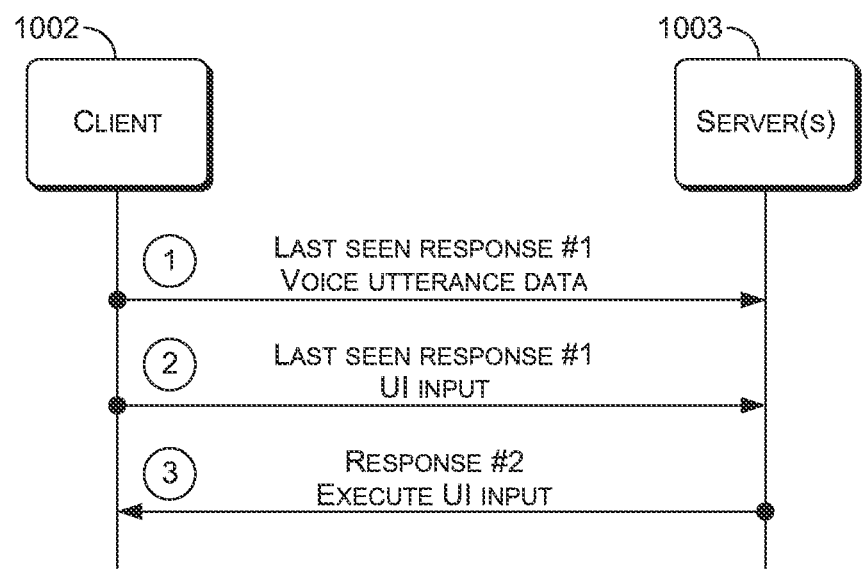
FIG. 10 is a sequence diagram illustrating how multimodal requests are handled, according to some embodiments of this disclosure.

FIG. 10 is a sequence diagram illustrating how multi-modal requests are handled, according to some embodiments. In some embodiments, the client 1002 represents or includes the functionality described with respect to the client 303 of FIG. 3. Additionally, in some embodiments, the one or more servers 1003 represent or functionality described with respect to the intermediary service 307, the speech recognition service 313, and/or the user intent understanding service 317 of FIG. 3.

Per step 1, the client 1002 sends the "last seen response #1" indicia, along with voice utterance data of a voice utterance request. A "last seen response" as described herein refers to an ID representing the last or most recent server response or message the client 1002 has processed (e.g., executed or responded to). For example, if the client 1002 sends voice utterance data representing a user request that says, "play song X," the one or more servers 1003 may return song X, thereby causing the client 1002 to play song X. Responsively, the client 1002 can populate a data structure (e.g., a queue) that indicates the last or most recent server response executed (i.e., the "last seen response"). Accordingly, next time the client 1002 issues a second request, if the client 1002 has had no other server responses that have been processed, the client 1002 can send the server(s) 1003 the same last seen response #1 ID.

Per step 2, within the same conversation (e.g., shortly after step 1 (e.g., within 3 seconds)), the client 1002 may send an additional UI input request based on a manual user interface input by the user, as well as the same last seen response ID #1, since the client 1002 has not yet received and processed a new response from the server(s) 1003. For example, a user may have issued a touch gesture request by touching a button indicative of a request to perform an action (e.g., play a song P). In some embodiments, this new step 2 request is generated or sent on a different web socket relative to the voice utterance request at step 1. In this way, different user inputs can be sent across different communication channels and processed by the same components.

Per step 3, the one or more servers 1003 responds to or executes the UI input request (e.g., and not the voice utterance data request), as well as transmits the response ID #2. Responsively, the client 1002 responds to or executes the UI input and increments or populates a data structure with "last seen response #2," corresponding to the "response #2" message sent by the server(s) 1003. In an illustrative example, the server(s) 1003 may return a song P requested via the UI input (e.g., a touch gesture) and include, in the same message, the response #2 ID, indicative of an ID of the particular response by the server(s) 1003. Responsively, the client 1002 may cause a device to play the song P (i.e., respond to or execute the UI request), as well as increment a queue data structure with response #2 ID (i.e., the last seen response ID #2), indicating that response #2 is the last server response the client 1102 has executed.

In some embodiments, the client 1002 only sees and process the response to the last request (e.g., the step 2 request and not the step 1 request), N. All server(s) 1003 responses from requests 1 to N−1 are dropped, cancelled, and/or ignored in some embodiments. This is because if the client 1002 had not ignored a response (e.g., the server(s) 1003 response to execute the voice command of step 1), the IDs of subsequent requests would change. If the one or more servers 1003 does not respond to request N, the user may not see any response at all. Accordingly, in particular embodiments, the one or more servers 1003 always respond to request N. In some instances, the one or more servers 1003 cannot know whether a give request n is request N until there is new request n+1 in the queue for the same request ID. In some embodiments, n and n+1 represents the request sequence as sent by the client 1002, not as received by the one or more servers 1003.

Figure 11:
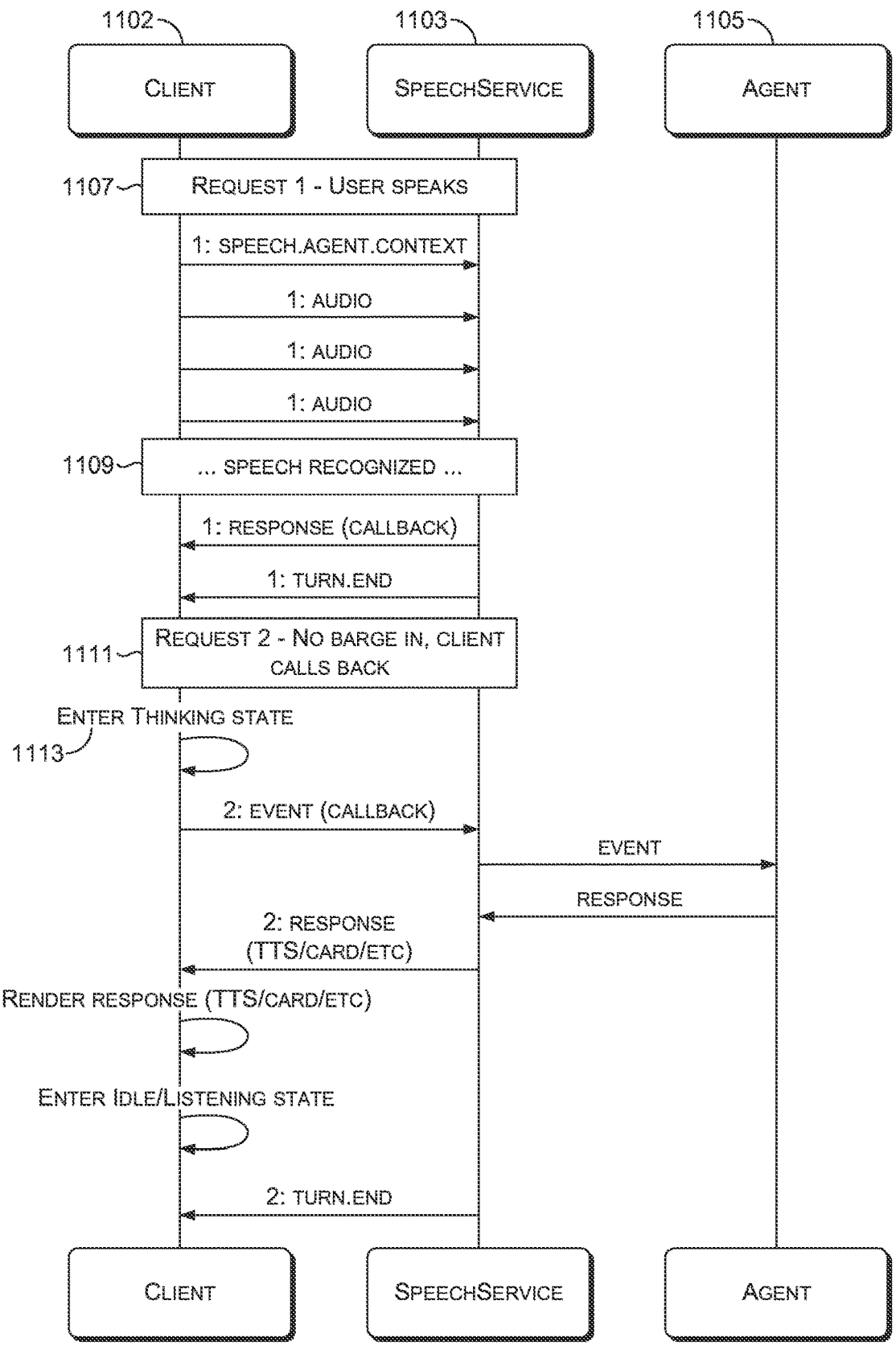
FIG. 11 is a sequence diagram illustrating how a voice utterance request is committed to via callback functionality, according to some embodiments of this disclosure.

FIG. 11 is a sequence diagram illustrating how a voice utterance request is committed to via callback functionality, according to some embodiments. In some embodiments, the client 1102 represents or includes the functionality described with respect to the client 1102 of FIG. 10, or client 303 of FIG. 3. Additionally, in some embodiments, the speech service 1103 and/or the agent 1105 represents or includes the functionality described with respect to the one or more servers 1003 of FIG. 10. In some embodiments, the speech service 1103 represents or includes functionality as described with respect to the speech recognition service 313. In some embodiments, the agent 1105 represents or includes the functionality as described with respect to the user intent understanding service 317 of FIG. 3.

FIG. 11 illustrates a speech only interaction and conversation where the user is not allowed to make additional manual user interface (i.e., "barge-in" requests) based on the client 1102 transmitting a callback message to a speech service. Various embodiments implement a "callback" message before committing to a speech query and only commit to the speech query upon successful callback. Throughout the lifetime of a web socket connection, a client can make one or more requests (also referred to as turns) by exchanging web docket messages. Per step 1107, the client 1102 encodes a voice utterance to voice utterance data to be transmitted to the speech service 1103. Per step 1109, the speech service 1103 recognizes the voice utterance data and sends a corresponding response callback (e.g., the "last seen response" ID referred to in FIG. 11).

Per step 1111, the client 1102 calls the speech service 1103 back via a callback operation. In FIG. 11, the user has not barged in or otherwise performed any UI interaction or manual user input. Accordingly, the client 1102 sends the "callback" message via step 1111. In response to the client sending the callback event per step 1111, the client 1102 enters the thinking state 1113 (e.g., processing a request after a user has engaged in a user action (e.g., a wake word or microphone activation) and voice utterance command). In some embodiments, when the client 1102 enters into the thinking state 1113, users are typically not allowed to perform any further UI interaction or manual user input. Accordingly, the agent 1105 helps execute the voice utterance request by responding to the callback event and causing the client 1102 to execute the voice utterance.

Figure 12:
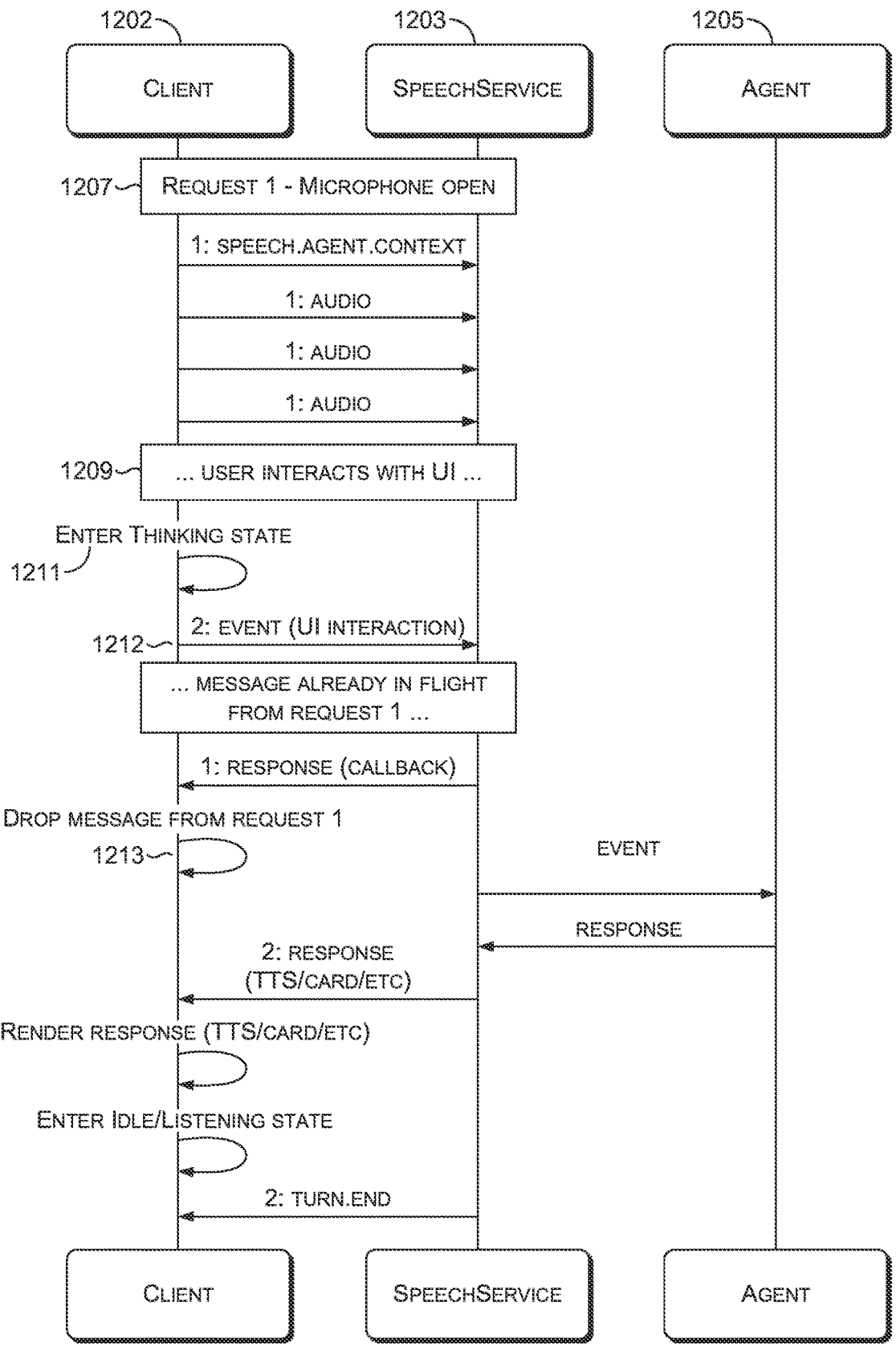
FIG. 12 is a sequence diagram illustrating how multimodal requests are handled via callback functionality, according to some embodiments of this disclosure.

In some embodiments, FIG. 11 and FIG. 12 represent new callback functionality. Such callback functionality can be represented, for example, by the one or more servers 1003 generating a new response before committing to a speech query or voice utterance using the following algorithm. If a particular request results in silence or no match, an empty response is returned, which prevents UI locking and re-prompts when the user is not interacting via speech. If response result is a phrase (e.g., "what reminder would you like for me to set?"), some embodiments send a callback action with a serialized result embedded in a data structure, such as a cookie as described herein. In some instances, the additional callback round trip will add some latency to speech interactions but UI interactions will not be impacted.

FIG. 12 is a sequence diagram illustrating how multimodal requests are handled via callback functionality, according to some embodiments. In some embodiments, the client 1202 represents or includes the functionality described with respect to the client 1102 or 1002 of FIG. 11 and FIG. 10, or client 303 of FIG. 3. Additionally, in some embodiments, the speech service 1203 and/or the agent 1205 represents or includes the functionality described with respect to the one or more servers 1003 of FIG. 10. In some embodiments, the speech service 1203 represents or includes functionality as described with respect to the speech recognition service 313 of FIG. 3. In some embodiments, the agent 1205 represents or includes the functionality as described with respect to the user intent understanding service 317 of FIG. 3.

FIG. 12 illustrates a speech interaction that is combined with an additional manual user interface "barge-in" inputs. Various embodiments implement a "callback" message before committing to a speech query and only commit to the speech query upon successful callback. The client 1302 may allow the user to "barge-in" or perform some manual user input action at any point until the callback action is handled. In some embodiments, if a callback action is issued, the client 1202 begins a new event request (e.g., a "last seen response") and discards all responses (e.g., "response #2" from the server(s) 1103 of FIG. 11) from the speech request.

Per step 1207, the microphone is opened and the client 1202 may encode a voice utterance of a user to send to the speech service 1203. Per step 1209, the client 1202 receives an indication that the user has performed manual user input or has otherwise interacted with a UI (e.g., touched a touch screen button). Per step 1211, the client 1212 enters into a thinking state. In response to the client 1202 sending the UI event corresponding to the barge-in (i.e., step 1212), which effectively acts as a callback event, the client 1212 can enter into the thinking state 1211. In some embodiments, in the thinking state 1211, the user may not be allowed to perform further UI interaction. In other words, the client 1202, for example, may not transmit or process any manual user input from the client to the speech service 1205.

Per step 1213, the message from request 1 via the step 1207 is dropped (e.g., because the barge-in request came later in time relative to the voice utterance request). Subsequently, the agent 1205 receives the even and submits a response corresponding to executing the request associated with the step 1209 in order to response to the manual user input.

In some embodiments, when the client 1202 initiates a new request, it enters a "thinking state." In some embodiments, the client 1202 ensures that in the thinking state, the user is not allowed to barge-in (e.g., with a manual user input, such as a touch), but rather delays sending such request, as described herein. Some embodiments clearly indicate that listening is off (a microphone is deactivated) and buttons are disabled or hidden. UI interaction performed in a thinking state may result in an unpredictable experience. In some embodiments, the client 1202 transitions out of a thinking state when executing a response or handling an error.

Figure 13:
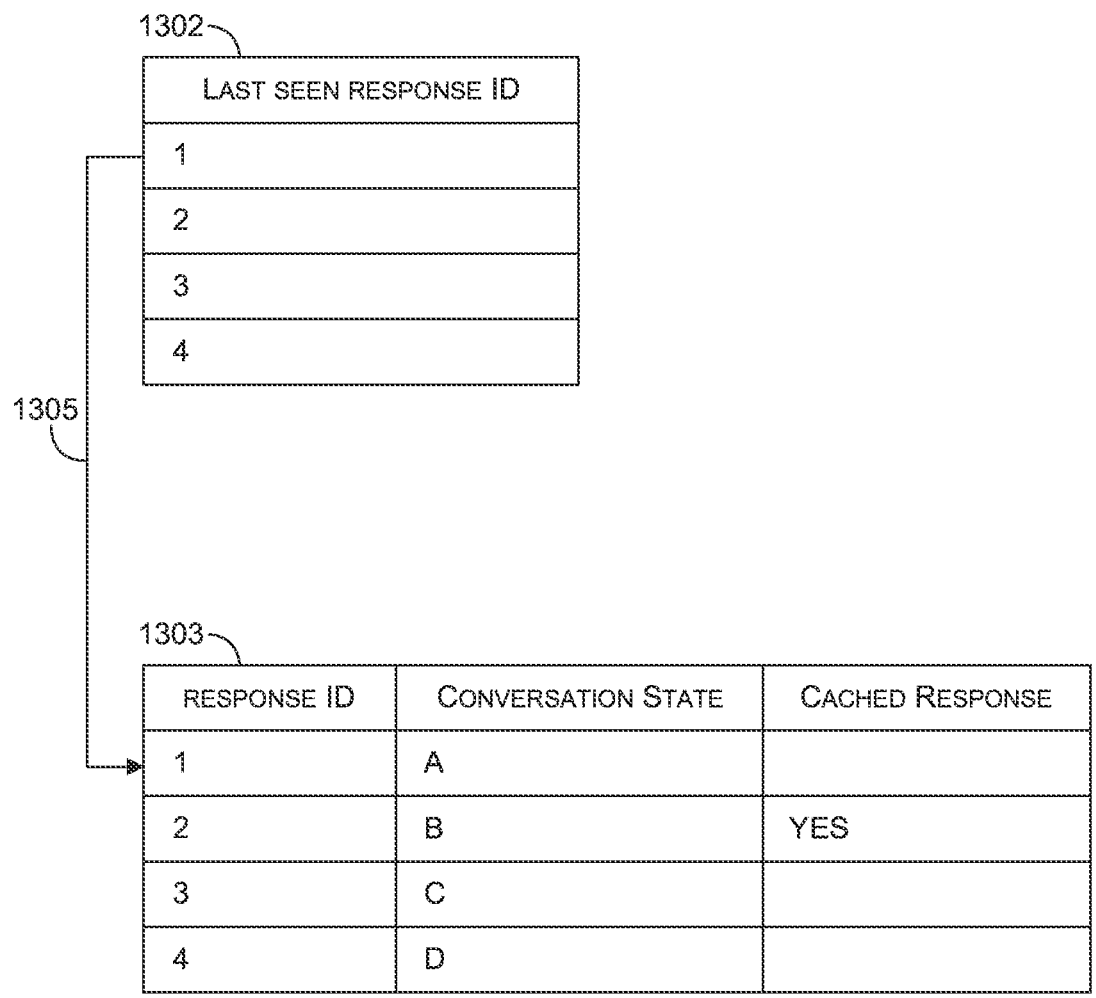
FIG. 13 is a schematic diagram of two data structures that illustrate how a client and one or more servers handle different types of inputs from a user, according to some embodiments of this disclosure.

FIG. 13 is a schematic diagram of two data structures 1302 and 1303 that illustrate how a client and one or more servers handle different types of inputs from a user, according to some embodiments. In some embodiments, the data structure 1302 represents the data structure the client 1002, 1102 and/or 1202 uses to perform its functionality. Likewise, in some embodiments, the data structure 1303 represents the data structure the one or more servers 1003, the speech service 1103/1203, the agent 1105, the intermediary service 307, the speech recognition service 313, and/or the user intent understanding service 317 uses to perform its respective functionality.

A client application can allow a user flexibility to provide multiple inputs and behave as though the last input is always accepted. For example, if the microphone of a client application is enabled and the user begins typing, in some embodiments, the client application turns off or deactivates the microphone to allow the user to type so that no conflicting or other audio is picked up and processed. In some embodiments, from the moment the user begins a new input modality (e.g., manual user input or speech), the client application discards any future responses from the server(s) associated with old input. In order to employ this seamless communication between client and server to process last inputs only, various embodiments employ the data structures 1302 and 1303.

In some embodiments, a client application stores or employs the data structure 1302 (e.g., a queue), which stores the "last seen response ID." In particular embodiments, every server response or every message received by the client from one or more servers contains a unique "response ID" (e.g., the "response ID" of the data structure 1303), also referred to herein as an "event ID." If the client processes the server response (e.g., changes client application pages or populates fields with values), the client updates the "last seen response ID" with this value. In an illustrative example, a user may issue a voice utterance to set a reminder. A server may responsively determine the user intent and send a server response to "populate Field X with a reminder to take kids to a soccer game" (ID 1). Responsively, the client application may process or respond to such server response by populating field X with the reminder to take kids to a soccer game. Such processing triggers the client to populate or increment the data structure 1302 with, for example, ID 1 (e.g., matching the server response ID) because the client has finished processing or executing the server response.

In some embodiments, every client request (e.g., a voice utterance or manual user input) includes the "last seen response ID." For example, using the illustration above, subsequent to the client application populating field X with the reminder and populating the data structure with ID 1, the client application may receive another user input, in the same conversation, such as a manual user input indicating to set a reminder to take the kids to the baseball game (instead of the soccer game). Responsively, the client application can transmit an indication of this input, as well as server response ID 1 (i.e., the "last seen response"), to one or more servers.

In some embodiments, the data structure 1302 represents a cookie that is updated by a client application and used by one or more servers. For example, a server may generate a unique ID with every response (i.e., a "response ID). In some embodiments, when generating a client response, one or more servers attach a "setCookie" action, which instructs the client to store the server's response ID locally (e.g., within the data structure 1302). In some embodiments, the client will only evaluate the "setCookie" action if it processed the response. On the next client request, the one or more servers may check the client's cookies.

In some embodiments, the one or more servers use the data structure 1302 (e.g., a hash map or lookup table) in order map a response ID, conversation state, and cached response to one another. In some embodiments, the data structure 1302 represents multiple data structures. For example, a first data structure can map "response ID" to "conversation state," and a second data structure can map "response ID" to "cached response."

In some embodiments, one or more servers store or employ multiple versions of a single conversation state. A "conversation state" as described herein, refers a point in time or event corresponding to a portion of an entire conversation or session. For example, a conversation state can correspond to a specific server response (e.g., a "response ID") that has been transmitted by a server in response to a client request, as described in more detail below. A "conversation" or "session" in this context may start when a client application or voice assistant recognizes a voice utterance or manual user input and ends with the client application responding to or executing such voice utterance or user input. In some embodiments, the determination of a single conversation or session can be based on a time threshold between inputs of a user. For example, if a user engages in a conversation by issuing a voice utterance "turn on the lights," but does not interact with a UI within X seconds (e.g., 1, 2, or 3 seconds), then the UI interaction may be considered a separate session or conversation.

Additionally or alternatively, in some embodiments, the determination of a single conversation or session can be based on an event between inputs or the type of input last engaged in. For example, if a user issued a voice utterance of "set a reminder," one or more servers may be uncertain as to which reminders the user needs to be reminded of. Accordingly, the conversation or session may continue because of this uncertainty and the server(s) may respond by causing display, at a UI, a list of potential reminders, at which point the user may make a corresponding selection. Such conversation or session may continue until the one or more servers process and cause a response for this request.

Instead of a single conversation, some embodiments store or employ a map of "response ID" to "conversation state," as illustrated in the data structure 1303. In some embodiments, in response to receiving a client request, the one or more servers loads the conversation state corresponding to the request's "last seen response" ID value. For example, using the illustration above, when the server receives a UI request to set a reminder to takes kids to the baseball game (instead of the soccer game, as the user initially uttered), the one or more server loads the conversation state A, corresponding to the "last seen response" ID1, as illustrated by the arrow 1305 of FIG. 13. In this way, one or more servers, will roll back conversational state to a past state and let the new incoming request (e.g., the request to set a reminder to take kids to the baseball game) play through it again (e.g., updates to a conversational state as modeled as a graph, and roll back to a previous node in the graph, as described in more detail below). This also allows the client to discard any responses from the server associated with the old input or request (e.g., the request to set a reminder to take kids to soccer).

As described with respect to the request type determining module 226 and the initial request processing module 230, some embodiments determine that a request is transactional or otherwise of a certain type. Some embodiments, such as a skill service, informs one or more servers that the request type is transactional, such as a purchase of an item, via a flag. Responsively, in some embodiments, when a conversation turn creates a transaction turn based on the determination that the type is transaction, the response is cached in addition to being sent to the client. This is illustrated in the table 1303, for example, where there is a "YES" flag under the "cached response" attribute, which indicates that the response corresponding to response ID 2 has been cached. Accordingly, if a future request contains the same response ID, one or more servers reply with the cached response instead of processing the request. This is because certain operations, such as transactions that transfer money to a retailer, may be undoable and so responding to the last response is futile and sending the first cached response is more appropriate. In this way, in certain embodiments, the first client request wins, as opposed to barge-in requests, as described herein.

Figure 14:
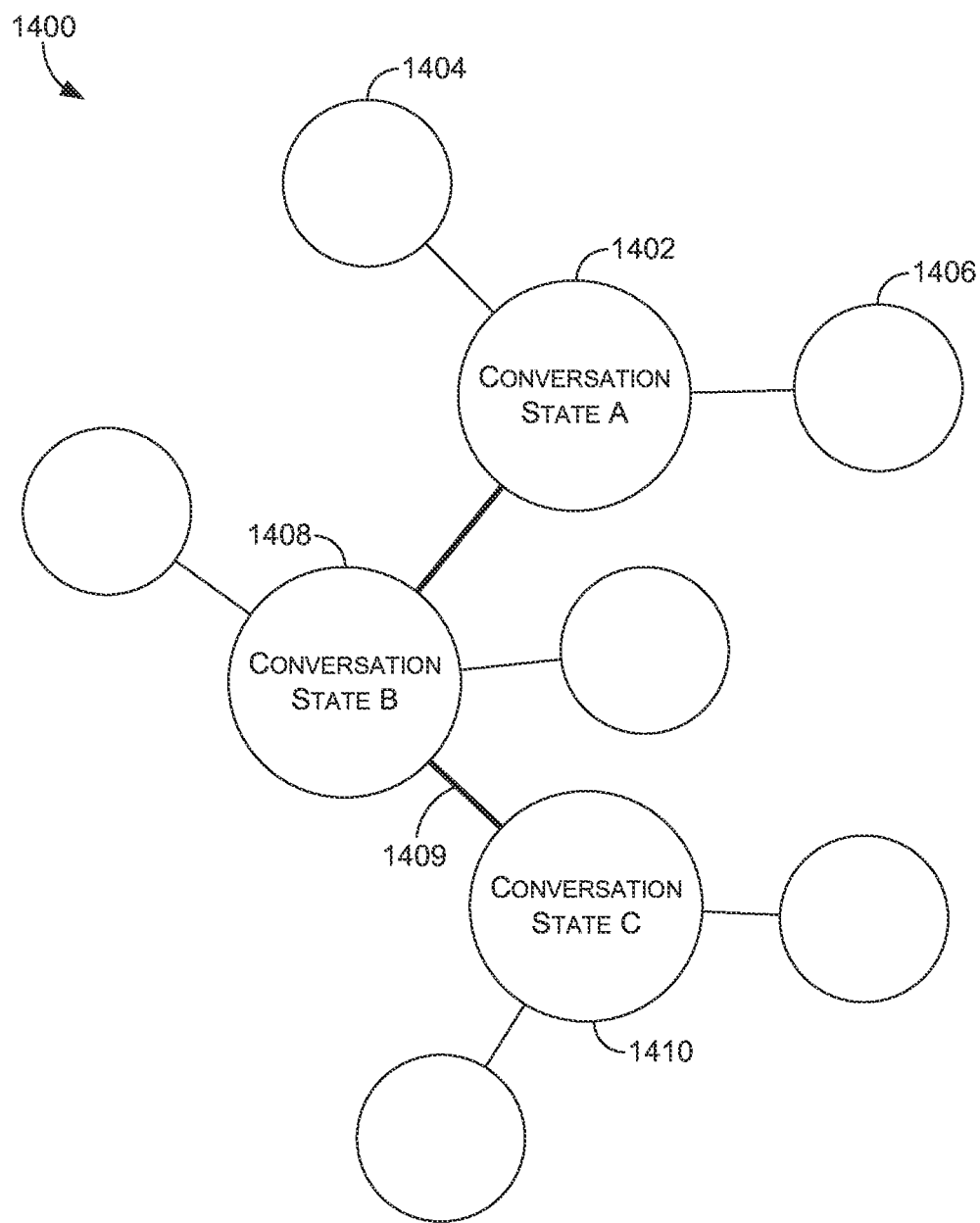
FIG. 14 is a schematic diagram of an example graph data structure for rolling back conversational states, according to some embodiments of this disclosure.

FIG. 14 is a schematic diagram of an example graph data structure 1400 for rolling back conversational states, according to some embodiments. In some embodiments, the graph structure 1400 represents the data contained in the data structure 1303 and is alternatively or additionally used. As described herein, particular embodiments, roll back a conversational state to a past state and let a new request be executed. This is modeled by the graph structure 1400 (e.g., an undirected graph), which can bi-directionally traverse different nodes and edges of the graph structure 1400 in order to add to or roll back to a node representing a conversational state.

In some embodiments, in response to receiving a signal or indication (e.g., from the request type determining module 226) that a request type is transactional or another type, particular embodiments (e.g., the one or more servers 1003) roll back a conversational state to a past state (an earlier node in a graph) and let the new request play through that state. For example, with respect to the graph structure 1400, node 1402 corresponding to conversation state A may represent a first in time conversation state, node 1408 corresponding to conversation state B may represent a second in time conversation state (subsequent to conversation state A), and node 1410 corresponding to conversation state may represent a third in time conversation state (subsequent to conversation state B). Accordingly, for example, modeling a roll back between conversation state C and conversation state B may include traversing from the node 1410 to the node 1408 via the edge 1409.

In some embodiments, there are other edges and nodes connected to nodes that represent conversational states, as illustrated by the nodes 1404 and 1406. Such nodes can represent additional information associated with conversation state, such as a response ID (e.g., node 1404) and whether the corresponding response is cached (e.g., node 1406), as described with respect to FIG. 13. In this way, particular embodiments can map the conversational states to corresponding response IDs and indications of whether they have been cached for responses back to the client.

Figure 15:
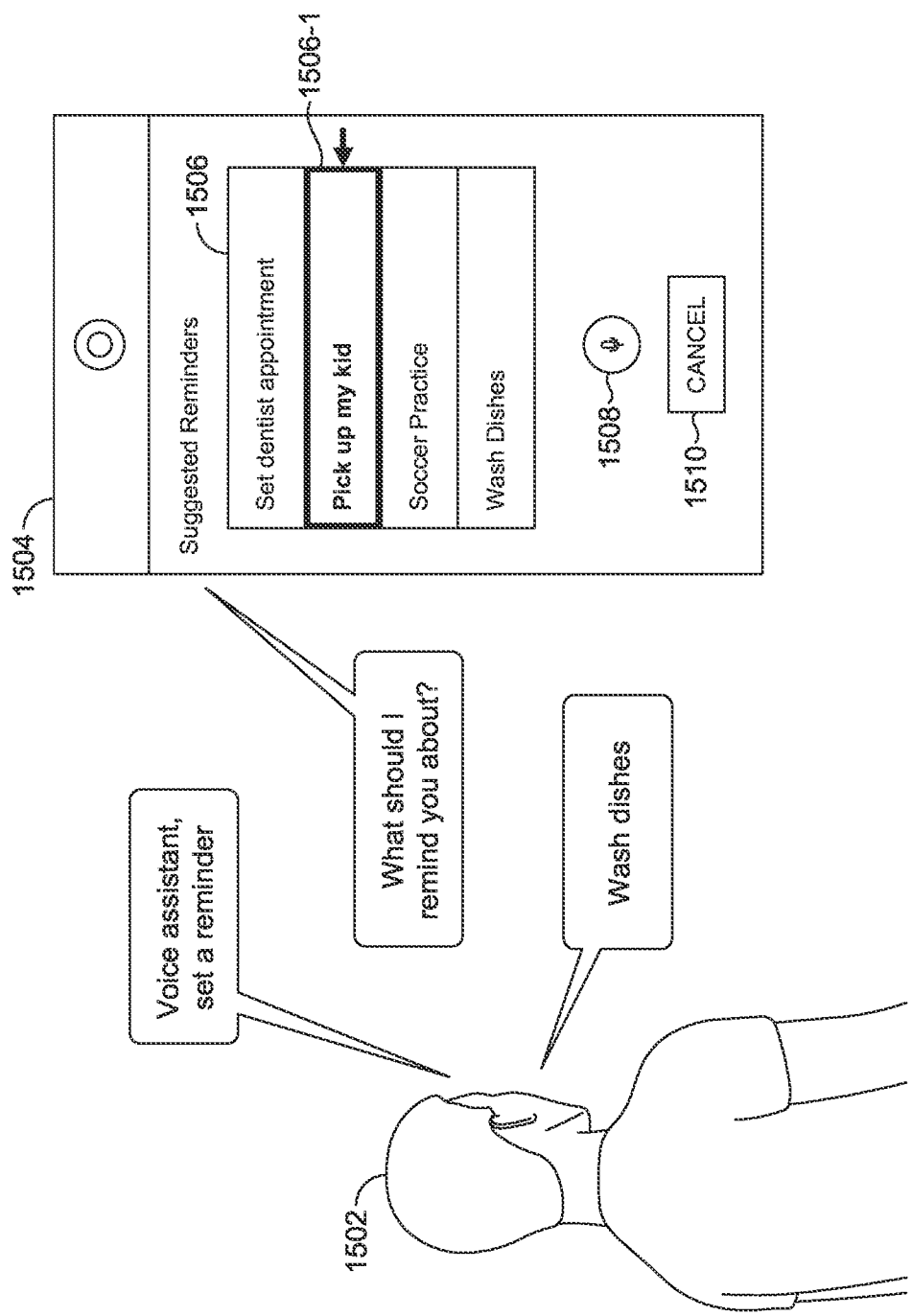
FIG. 15 is a schematic diagram illustrating how multimodal inputs are handled from a user perspective, according to some embodiments of this disclosure.

FIG. 15 is a schematic diagram illustrating how multi-modal inputs are handled from a user perspective, according to some embodiments. FIG. 15 specifically illustrates how a conversation or session is handled when a user issues a voice utterance but then performs conflicting user interface requests (e.g., a "barge-in" request). At a first time the user 1502 issues a wake word "voice assistant," and then issues the voice utterance of "set a reminder." Responsively, the client application or voice assistant utters "what should I remind you about?" and then keeps a microphone communication channel open to listen for the user's reply. As illustrated in the screenshot 1504, the client application may further responsively cause display of a list 1506, which is indicative of a set of recommended reminders (e.g., based on learning past reminders the user has set via a machine learning model). At this point, the user 1502 can speak, type, or touch a suggested reminder. The user 1502 may further provide multiple inputs with various combinations.

In response to the client application causing display of the list 1506, the user 1502 then issues the voice utterance, "wash dishes" to select the particular reminder. While one or more servers (e.g., the one or more servers 1003) are processing this request, a client application and/or one or more servers may receive an indication that the user 1502 has selected a user interface element indicative of a conflicting manual user input. For example, particular embodiments can receive an indication that the user 1502 has selected the "pick up my kid" reminder indicated in the UI element 1506-1. Perhaps the user forgot, for example, that they have already set a reminder about washing the dishes but needed to set a reminder to pick a kid up. Accordingly, the user 1502 may wish to undue the voice utterance request. Accordingly, based at least in part on receiving an indication of the manual user input click of the UI element 1506-1 being received (e.g., by a client application and/or server) last or more recent relative to the voice utterance to "wash dishes," particular embodiments execute or reply to the UI click of the UI element 1506-1 instead of the voice utterance to "wash dishes." In order to more clearly indicate, to the user 1502, which input was processed, in particular embodiments the voice assistant speaks or causes display of a responding message of, "I'm setting a reminder for you to pick up your kid" and/or "I'm disregarding to set your reminder to wash your dishes . . . is this correct?"

Alternatively or additionally, and in identical fashion, particular embodiments may receive an indication that the user 1502 has selected the "cancel" button 1510 subsequent to receiving the "wash dishes" request. Accordingly, based on receiving of the indication that the "cancel" button 1510 has been input or received last or later in time relative to the "wash dishes" voice utterance, particular embodiments respond to or execute the corresponding cancel request in order to delete or undue the reminder to wash dishes. Subsequently, particular embodiments receive an indication that the user 1502 has selected the microphone button 1508 so that the user 1502 can issue a voice utterance of the correct reminder (e.g., instead of selecting one via the UI of the screenshot 1504).

Responding to or executing the last received indications of inputs considers several different input combinations. For example, the user 1502 may issue a voice utterance and while speaking, click on the UI element 1506-1 mid-sentence. In this example, particular embodiments deactivate a microphone as soon as or in response to receiving an indication that the user has issued a manual issuer input request (e.g., the click of the UI element 1506-1). In this way, there is less likely to be error messages or user confusion as to what input is processed since all of the voice utterance data that is input or received after receiving an indication of the manual user input is disregarded. Thus, in these embodiments, as soon as or in response to determining that the latter input is the manual user input of the UI element 1506-1, particular embodiments deactivate the microphone regardless of whether the user is in mid-sentence or not.

In some embodiments, the more recently received input need not be manual user input and the initial input need not be a voice utterance, but the reverse inputs can be received. In this situation, some embodiments execute or respond only to the voice utterance and exclude from responding to the manual user input because the voice utterance was received or input more recently. For example, referring to FIG. 15, particular embodiments may issue the voice assistant request, "what should I remind you about?" Particular embodiments may then receive an indication that the user 1502 has selected the UI element 150-6-1 to pick up their kid. Subsequently, the user 1502 may issue the "wash dishes" utterance and particular embodiments consequently receive this request later in time relative to the manual user input. Accordingly, based at least in part on particular embodiments receiving an indication that the "wash dishes" input was received later in time relative to the selection of the UI element 1506-1, some embodiments respond to or execute the "wash dishes" input instead of the "pick up my kid" input.

In some instances, users may perform two or more conflicting manual user inputs or voice utterances. Some embodiments respond to the most recent input. For example, as illustrated in FIG. 15, particular embodiments may receive an indication that the user has issued a "wash dishes" input and then later receive an indication that the user has selected the UI element 1506-1. As described above, normally particular embodiments respond to or execute the request association with the selection of the UI element 1506-1 because it is input or received later in time relative to the voice utterance. However, the user 1502 may again provide another conflicting manual user input, such as clicking on the user interface element corresponding to "set dentist appointment," which also conflicts with the "pick up my kid" reminder associated with the other manual user input of clicking on the UI element 1506-1. In these embodiments, the "set dentist appointment" will be responded to or executed because it was input or received last or later in time relative to the "wash dishes" voice utterance input and the user selection of the UI element 1506-1. Prior to these various embodiments described herein, existing technologies would generate unpredictable outcomes or error messages and it would not be clear to the user which input was processed, as described herein.

In some embodiments, a client application stops speaking in response to receiving an indication that the user has engaged in particular input. For example, a client application may engage in the voice prompt, "what should I remind you about," as illustrated in FIG. 15. However, in response to receiving an indication that the user 1502 has clicked the user interface element 1506-1 while this phrase is uttered, some embodiments cause the client application to stop speaking and begins to process the touch (or voice utterance of the user 1502 if the user 1502 engages in a voice utterance instead of the click of 1506-1). Such stoppage of speaking indicates, to the user 1502, that the voice assistant realizes that the user 1502 knows which reminder to select based on the click of the user interface element 1506-1. Accordingly, the client application need not redundantly ask the user what reminder they would like to be reminded about.

Figure 16:
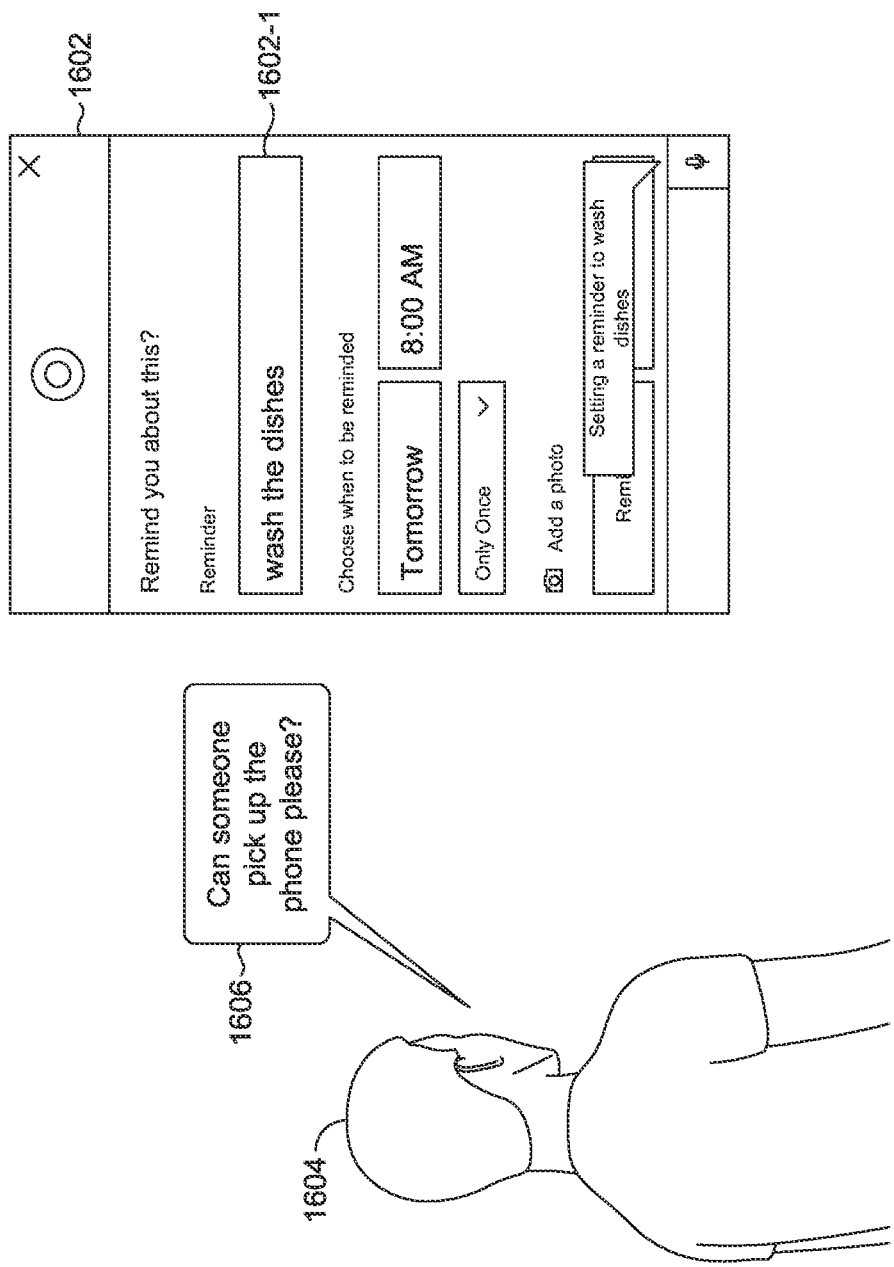
FIG. 16 is a schematic diagram illustrating how multimodal inputs are handled from a user perspective, according to some embodiments of this disclosure.

FIG. 16 is a schematic diagram illustrating how multi-modal inputs are handled from a user perspective, according to some embodiments. FIG. 16 specifically illustrates how a conversation or session is handled when a user speaks while simultaneously performing manual user input at a user interface of the screenshot 1602. As described herein, particular embodiments support multi-modal experience where the user is allowed to both speak and interact with UI elements. For example, a client application as illustrated in FIG. 16 may ask a question "Remind you about this?", begin listening, and show various buttons and test boxes on the screen (e.g., similar to the list 1506 of FIG. 15). The user 1604 may type "wash the dishes" in the field 1602-1 while at the same time say, "can someone pick up the phone?" In this situation, a phone may be currently ringing and the user 1604 may be speaking to another person in their household, as opposed to a client application or voice assistant. However, because a voice assistant's microphone may have been activated (e.g., via a prior wake word), it may pick up and encode this unrelated voice utterance. In some embodiments, when there are simultaneous inputs that are of a different type as illustrated in FIG. 16, particular embodiments stop the speech flow or deactivate the microphone in response to receiving an indication that the user has performed a manual user input. In FIG. 16, for example, particular embodiments respond to or only execute the textual input to "wash the dishes" as indicated in the field 1602-1 in response to receiving an indication that the user 1604 has at least partially begun to input this string. In some embodiments, even the voice utterance segments that were issued after receiving indication that the user has begun manual user input are disregarded so that only the manual user input requests are responded to or executed.

In typical voice assistant SDK stacks, if the user 1604 speaks (or has speech in the background) and interacts with the UI at the same time, the outcome is generally unpredictable. Moreover, the user 1604 will not know which input was processed. Accordingly, particular embodiments support multimodal experiences with predictable outcomes based on a set of new rules, as described above.

Figure 17:
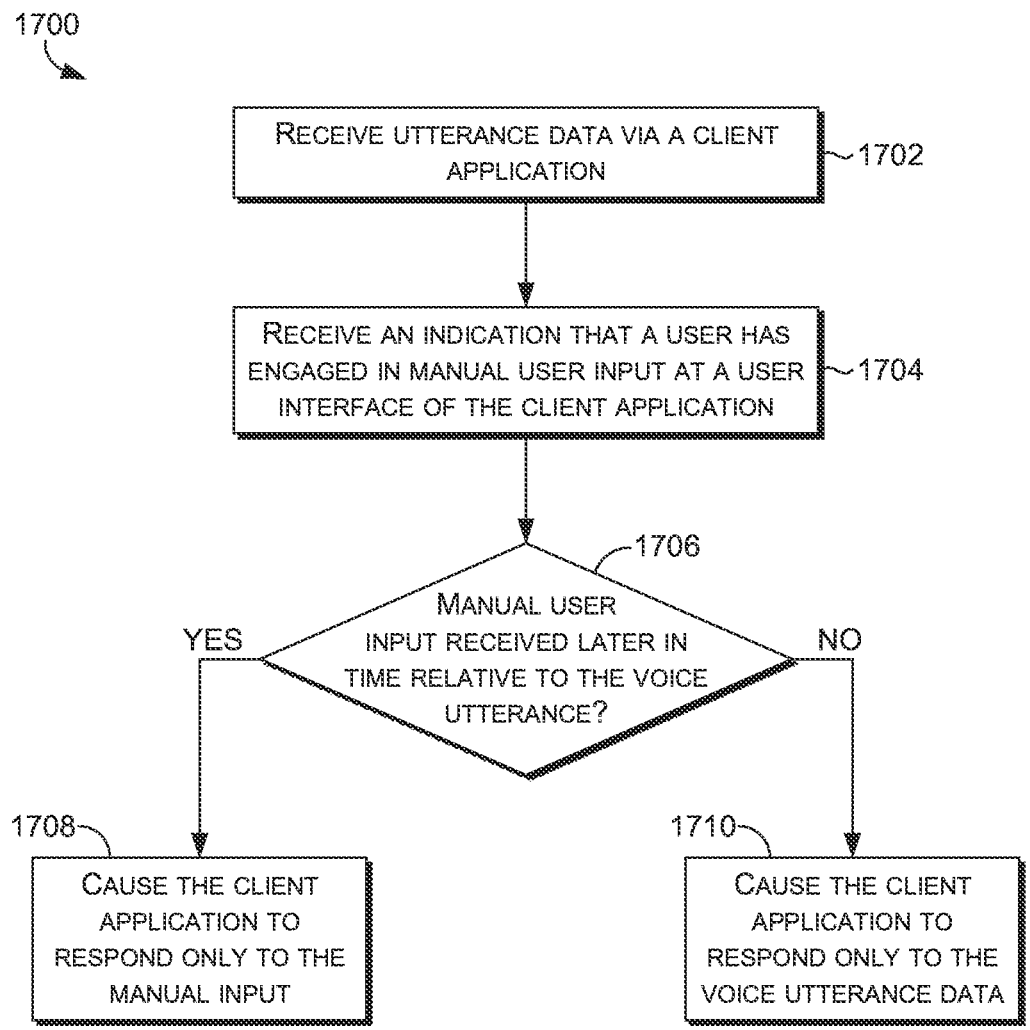
FIG. 17 is a flow diagram of an example process for selectively responding to only one input of multiple inputs, according to some embodiments of this disclosure.

FIG. 17 is a flow diagram of an example process 1700 for selectively responding to only one input of multiple inputs, according to some embodiments. In some embodiments, the process 1700 represents server-side functionality (e.g., the one or more servers 1003) and/or client functionality (e.g., the client 1002).

Per block 1702, utterance data is received via a client application. The utterance data may be associated with a voice utterance of a user. In an illustrative example of block 1702, referring back to FIG. 10, the one or more servers 1003 may receive the utterance data from the client 1002, via step 1. Prior to such receiving, the client application can perform various actions. For example, as described herein, the client application can detect a first user action of a user, such as a wake word or selection of a user interface element (e.g., the microphone button 1508). Responsively, the client application can initiate a recording of or otherwise capture (or receive) audio data. Based at least in part on the initiating of the recording of audio data, the client application can encode the voice utterance associated with the user and/or then transmit the voice utterance to one or more servers.

In some embodiments, block 1702 includes or is followed by determining that the voice utterance is associated with a first response type. Examples of this are described with respect to the request type determining module 226 of FIG. 1. For example, upon receiving the voice utterance data, particular embodiments determine that the type of request is a transactional request associated with the purchase of one or more goods or services. For instance, central server (e.g., the intermediary service 307) can receive a signal from a skill service that the request type is a request to purchase goods from an electronic marketplace. Such determination can be used for further downstream processing of inputs, as described in more detail below.

Per block 1704, particular embodiments receive an indication (e.g., a transmitted signal or flag value) that a user has engaged in manual user input at a user interface of the client application. In these embodiments, a client application can first receive manual user input associated with the user, where the manual user input is performed at a user interface of the client application. Subsequently, such user interface request can be transmitted and processed by one or more servers. Examples of block 1704 are described with respect to FIG. 15 where embodiments can receive an indication that the user has selected the user interface element 1506-1 or the cancel button 1510. Further examples of this are described with respect receiving what the user has typed in the field 610 of FIG. 6B, which may contradict or conflict with the voice utterance 606. Yet other example are described with respect to FIG. 7B, where embodiments can receive an indication that the user has selected the cancel button 708-4.

The "manual user input" as described herein can be any suitable user interaction that excludes voice utterance inputs. For example, the manual user input can be a touch gesture by the finger of a user. Such "touch gesture" can be or include the touching of a logical user interface button on a touch screen, a swiping gesture (e.g., to remove/delate a UI item), or any other suitable gesture where the user moves his or her fingers to provide a recognized input (e.g., a pinching or expanding of fingers to zoom in or out respectively of a display screen).

In some embodiments, such manual user input can alternatively or additionally be text entry input by the user as described, for example, with respect to the user typing in the field 610 of FIG. 6B. In some embodiments, such manual user input can alternatively or additionally be a pointer (e.g., mouse) click by the user, such as illustrated, for example, with respect to the selection of the user interface element 1506-1 of FIG. 15.

Per block 1706, particular embodiments (e.g., the one or more servers 1103) determine whether the manual user input was received (and/or input by the user) later in time (or more recently) relative to the voice utterance. For example, the one or more servers 1003 receives transmitted requests corresponding to steps 1 and 2 of FIG. 10, where the one or more servers 1003 increment a data structure with timestamps indicating when the one or more servers 1003 received such requests to determine which one was received later in time.

Per block 1708, if the manual user input was received later in time relative to the voice utterance, then particular embodiments cause the client application to respond only to the manual user input (and refrain from responding to the voice utterance). Examples of this are described with respect to FIG. 15 where the request corresponding to the selection of the user interface element 1506-1 is executed instead of the "wash dishes" voice utterance from the user 1502. Some embodiments additionally or alternatively deactivate a microphone based on the receiving of the manual user input (e.g., regardless of the order that different inputs were received). And in response to the deactivating of the microphone, as well as the receiving of the manual user input, particular embodiments respond only to the manual user input and not the voice utterance. Examples of this are described with respect to FIG. 16, where simultaneous inputs can be received but only one processed at a given time.

Per block 1710, particular embodiments cause the client application to respond only to the voice utterance corresponding to the voice utterance data (and not the manual user input). As described herein with respect to the request type determining module 226 and the initial request processing module 230, particular embodiments determine that the voice utterance was received (or input by the user) prior to the receiving of the manual user input. And some embodiments reply or respond to the voice utterance and refrain from replying or responding to the manual user input based at least in part on the determining that the voice utterance is associated with the first request type (e.g., a transactional type) and/or determining that the voice utterance was received prior to the receiving of the manual user input. Likewise, some embodiments respond only to the voice utterance based on the voice utterance being received later in time relative to the manual user input such that the manual user input is excluded from being responded to.

In some embodiments, any functionality described with respect to FIG. 17 is combined with any other functionality described herein, such as functionality described with respect to the process 800 of FIG. 8 and/or the process 900 of FIG. 9. For example, some embodiments, render a first instance at a client application. Some embodiments detect a user action (e.g., a wake word or click of a microphone button) of a user. Some embodiments initiate a recording of audio data in response to the detection. Based at least in part on the initiating of the record, particular embodiments encode a voice utterance of the user. Based at least in part on information within the first instance, some embodiments extract, from the first instance and at the client application, a user view context. Based at least in part on the user view context and the voice utterance, particular embodiments determine (or cause to be determined) a user intent. Based at least in part on the user intent and the voice utterance being received later in time relative to the manual user input, particular embodiments respond to the voice utterance (e.g., and not the manual user input) by automatically populating, with data, the first instance or a second instance of the client application.

In some embodiments, however, one or both of the voice utterance or manual user input is responded to by populating, with data, the first instance or a second instance of the client application. For example, if the manual user input is received later in time relative to the voice utterance (or received at all) in the same conversation, then only the manual user input may be responded to. In these embodiments, the manual user input can be inputted or received at any time or during a time when user intent is determined. In some embodiments, when manual user input is received later in time relative to the voice utterance (or received at all) in the same conversation, the user intent is determined to include canceling or refraining from responding to the voice utterance based on the manual user input conflicting with the voice utterance (e.g., via NLP) or occurring at all. In some embodiments, however, manual user input does not conflict with voice utterances but rather compliments or adds/filters additional requests (or vice versa). In these instances, some embodiments process both inputs (e.g., via NLP). For example, a user may issue a voice utterance that says, "invite John to the meeting." Shortly thereafter (e.g., 1 second later), the user may have forgot to mention to invite Jane to the meeting. Instead of uttering this, the user may decide to click on or otherwise perform manual user input to request to invite Jane to the meeting. In these embodiments, the invite is not conflicting, and therefore the user intent may be to add both participants. Accordingly, instead of refraining from executing one input or another, some embodiments execute or respond to both inputs.

Figure 18:
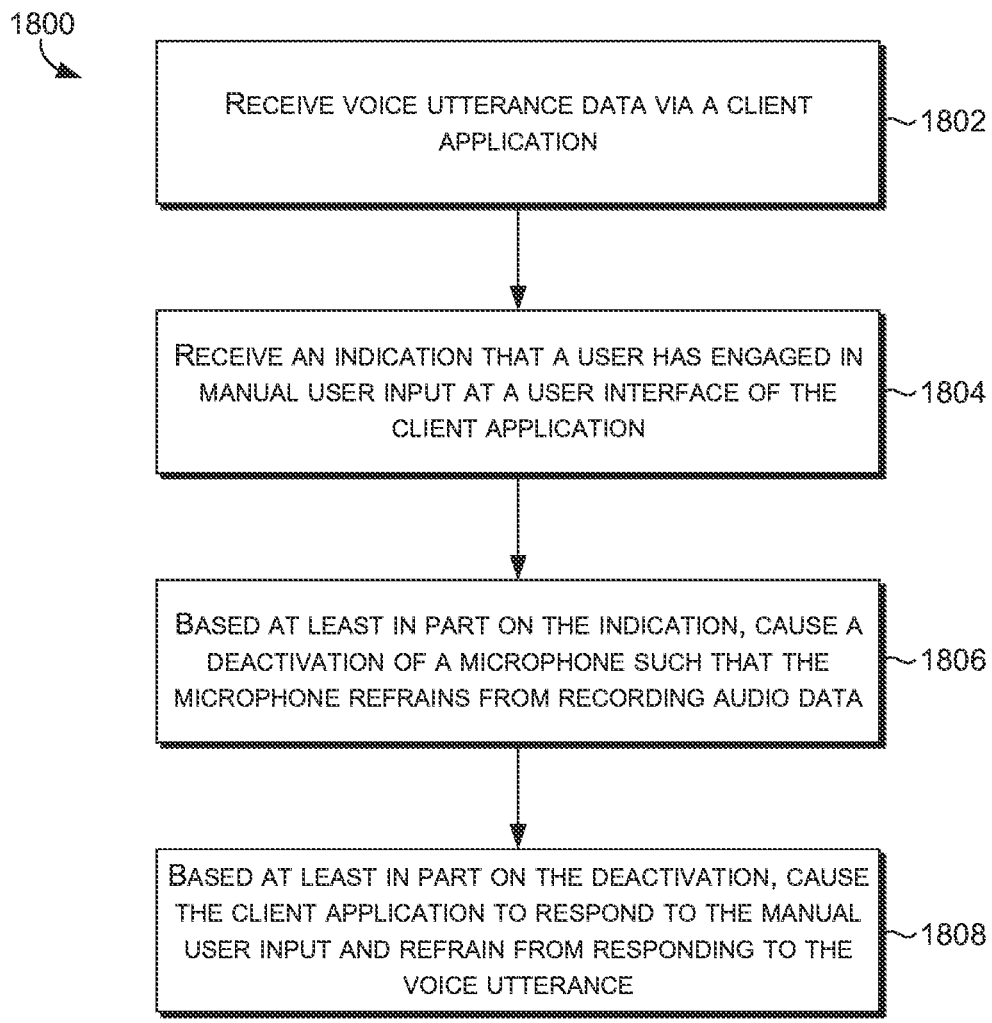
FIG. 18 is a flow diagram of an example process for selectively responding to only one input of multiple inputs, according to some embodiments of this disclosure.

FIG. 18 is a flow diagram of an example process 1800 for selectively responding to only one input of multiple inputs, according to some embodiments. In some embodiments, the process 1800 represents server-side functionality (e.g., the one or more servers 1003) and/or client functionality (e.g., the client 1002).

Per block 1802, utterance data is received via a client application. In some embodiments, block 1802 includes the functionality described with respect to block 1702 of FIG. 17. Per block 1804, some embodiments receive an indication that a user has engaged in manual user input at a user interface of the client application. In some embodiments, block 1804 includes the functionality described with respect to block 1704 of FIG. 17.

Per block 1806, based at least in part on the indication, some embodiments cause a deactivation or inactivation of a microphone such that the microphone refrains from recording or listening for audio data, or audio data that is received via the microphone is not processed or responded to. Examples of this are described with respect to FIG. 16, where the user 1604 has engaged in manual user input of the "wash the dishes" string to the filed 1602-1. Responsive to embodiments detecting that the user has begun to input this string, particular embodiments deactivate a microphone such that the utterance 1606 is not picked up by the microphone. In this way, there is less likely to be errors in executing client requests. Some embodiments additionally deactivate the microphone based on a voice utterance being issued or received prior in time relative to the manual user input or the manual user input being issued or received later in time relative to the voice utterance.

Per block 1808, some embodiments cause the client application to respond to the manual user input and refrain from responding to the voice utterance based at least in part on the deactivation. Examples of this are described with respect to FIG. 16, where the voice assistant refrains from responding to the voice utterance 1606, but responds to the manual user input.

Figure 19:
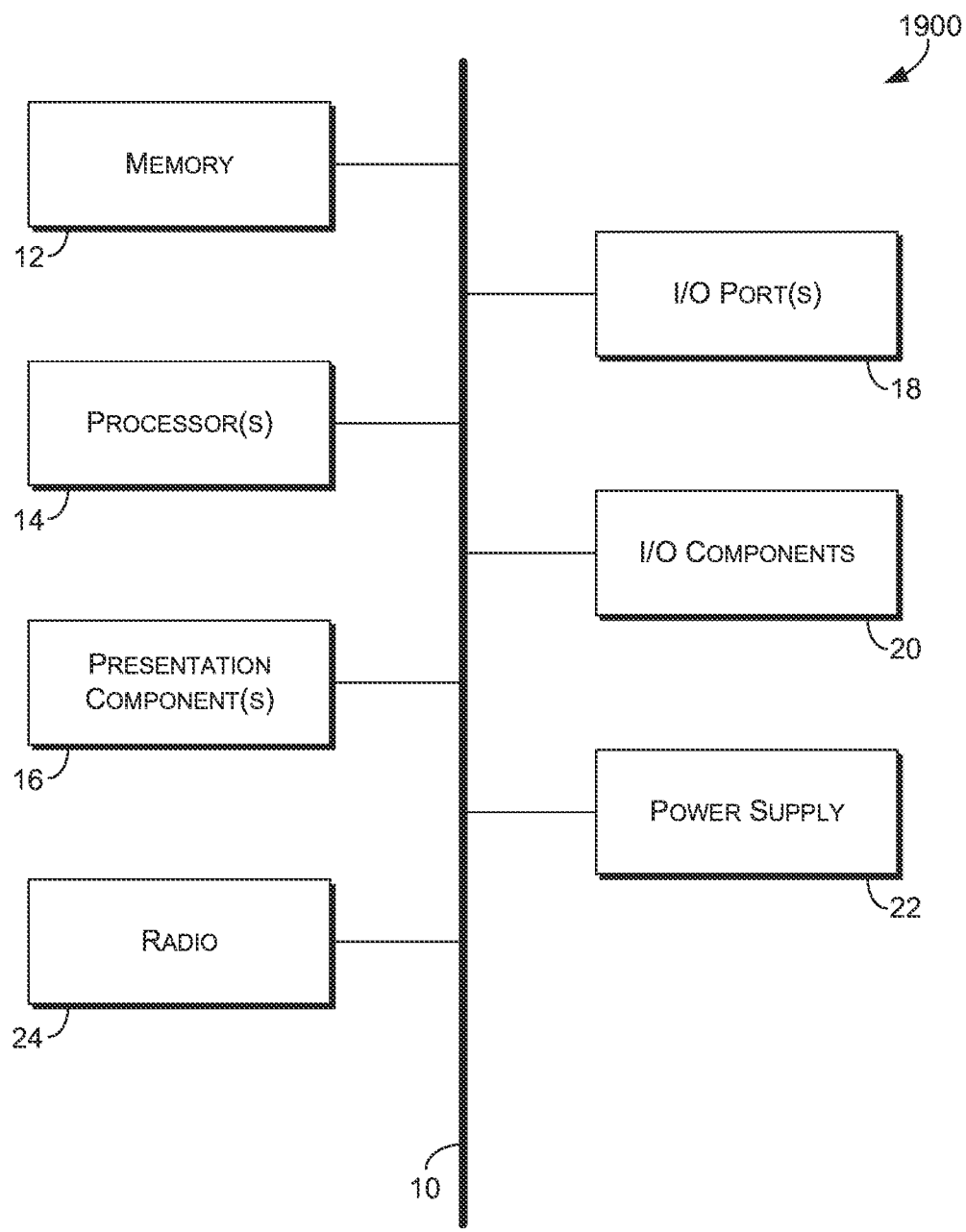
FIG. 19 is a block diagram of an example computing device suitable for use in implementing some embodiments described herein.

Having described various embodiments of the disclosure, an exemplary computing environment suitable for implementing embodiments of the disclosure is now described. With reference to FIG. 19, an exemplary computing device 1900 is provided and referred to generally as computing device 1900. The computing device 1900 is but one example of a suitable computing environment and is not intended to suggest any limitation as to the scope of use or functionality of the disclosure. Neither should the computing device 1900 be interpreted as having any dependency or requirement relating to any one or combination of components illustrated.

Embodiments of the disclosure may be described in the general context of computer code or machine-useable instructions, including computer-useable or computer-executable instructions, such as program modules, being executed by a computer or other machine, such as a smartphone, a tablet PC, or other mobile device, server, or client device. Generally, program modules, including routines, programs, objects, components, data structures, and the like, refer to code that performs particular tasks or implements particular abstract data types. Embodiments of the disclosure may be practiced in a variety of system configurations, including mobile devices, consumer electronics, general-purpose computers, more specialty computing devices, or the like. Embodiments of the disclosure may also be practiced in distributed computing environments where tasks are performed by remote-processing devices that are linked through a communications network. In a distributed computing environment, program modules may be located in both local and remote computer storage media including memory storage devices.

Some embodiments may comprise an end-to-end software-based system that can operate within system components described herein to operate computer hardware to provide system functionality. At a low level, hardware processors may execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. Accordingly, in some embodiments, computer-executable instructions may include any software, including low level software written in machine code, higher level software such as application software and any combination thereof. In this regard, the system components can manage resources and provide services for system functionality. Any other variations and combinations thereof are contemplated with embodiments of the present disclosure.

With reference to FIG. 19, computing device 1900 includes a bus 10 that directly or indirectly couples the following devices: memory 12, one or more processors 14, one or more presentation components 16, one or more input/output (I/O) ports 18, one or more I/O components 20, and an illustrative power supply 22. Bus 10 represents what may be one or more busses (such as an address bus, data bus, or combination thereof). Although the various blocks of FIG. 19 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 19 is merely illustrative of an exemplary computing device that can be used in connection with one or more embodiments of the present disclosure. Distinction is not made between such categories as "workstation," "server," "laptop," "handheld device," or other computing device, as all are contemplated within the scope of FIG. 19 and with reference to "computing device."

Computing device 1900 typically includes a variety of computer-readable media. Computer-readable media can be any available media that can be accessed by computing device 1900 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 1900. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 12 includes computer storage media in the form of volatile and/or nonvolatile memory. The memory may be removable, non-removable, or a combination thereof. Exemplary hardware devices include solid-state memory, hard drives, optical-disc drives, or other hardware. Computing device 1900 includes one or more processors 14 that read data from various entities such as memory 12 or I/O components 20. Presentation component(s) 16 presents data indications to a user or other device. Exemplary presentation components include a display device, speaker, printing component, vibrating component, and the like.

The I/O ports 18 allow computing device 1900 to be logically coupled to other devices, including I/O components 20, some of which may be built in. Illustrative components include a microphone, joystick, game pad, satellite dish, scanner, printer, wireless device, and the like. The I/O components 20 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1900. The computing device 1900 may be equipped with depth cameras, such as stereoscopic camera systems, infrared camera systems, RGB camera systems, and combinations of these, for gesture detection and recognition. Additionally, the computing device 1900 may be equipped with accelerometers or gyroscopes that enable detection of motion. The output of the accelerometers or gyroscopes may be provided to the display of the computing device 1900 to render immersive augmented reality or virtual reality.

Some embodiments of computing device 1900 may include one or more radio(s) 24 (or similar wireless communication components). The radio 24 transmits and receives radio or wireless communications. The computing device 1900 may be a wireless terminal adapted to receive communications and media over various wireless networks. Computing device 1900 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, and the like.) can be used in addition to or instead of those shown.

Embodiments of the present disclosure have been described with the intent to be illustrative rather than restrictive. Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

As used herein, the term "set" may be employed to refer to an ordered (i.e., sequential) or an unordered (i.e., non-sequential) collection of objects (or elements), such as but not limited to data elements (e.g., events, clusters of events, and the like). A set may include N elements, where N is any non-negative integer. That is, a set may include 0, 1, 2, 3, . . . N objects and/or elements, where N is an positive integer with no upper bound. Therefore, as used herein, a set may be a null set (i.e., an empty set), that includes no elements. A set may include only a single element. In other embodiments, a set may include a number of elements that is significantly greater than one, two, or three elements. As used herein, the term "subset," is a set that is included in another set. A subset may be, but is not required to be, a proper or strict subset of the other set that the subset is included in. That is, if set B is a subset of set A, then in some embodiments, set B is a proper or strict subset of set A. In other embodiments, set B is a subset of set A, but not a proper or a strict subset of set A.

Other Embodiments

In some embodiments, a computerized system, such as the computerized system described in any of the embodiments above, comprise at least one computer processor, one or more computer storage media storing computer-useable instructions that, when used by the at least one computer processor, cause the at least one computer processor to perform operations. The operations comprise detecting a first user action of a user and subsequent to the detecting, capturing audio data comprising a voice utterance associated with the user. The operations further comprise receiving, via a user interface, a manual user input associated with the user. The operations further comprise based at least in part on whether the voice utterance or the manual user input was received later in time, responding to only the voice utterance or only the manual user input and refraining from responding to both the voice utterance and the manual user input. Advantageously, these and other embodiments, as described herein, improve the way computers operate in terms of computer resource consumption (e.g., CPU, memory, I/O, network latency). Because various embodiments are adequately integrated with client applications, they do not require users to manually perform excessive input, such as exiting out of a voice assistant-controlled user interface canvas, drilling to other client application pages to complete a task associated with the voice utterance (e.g., switching to a chat window), sending queries, and the like. Rather, these embodiments do not rely on a voice assistant-controlled layer sitting on top of a client application and instead automatically provide data. Accordingly, when a TCP/IP packet, for example, traverses a network, there are reduced throughput and latency costs because less data is being sent over a computer network. In like manner, there are not as many disk I/O costs (e.g., excess physical read/write head movements on non-volatile disk) because the user does not have to keep inputting information, such as by interacting with voice assistant-controlled windows, populating various fields of the voice assistant-controlled windows, and the like. Therefore, the computing system does not have to reach out to the storage device to perform a read or write operation as many times relative to existing technologies, which reduces I/O.

In any combination of the above embodiments of the computerized system, the manual user input comprises a touch gesture by the user, text entry input by the user, or a pointer click by the user.

In any combination of the above embodiments of the computerized system, the user action includes at least one of: a wake word issued by the user and an interaction with an element of the user interface.

In any combination of the above embodiments of the computerized system, the operations further comprise: determining that the voice utterance is associated with a first response type; determining that the voice utterance was received prior to the receiving of the manual user input; and based at least in part on the determining that the voice utterance is associated with the first response type and the determining that the voice utterance was received prior to the receiving of the manual user input, causing a response to the voice utterance and refraining from responding to the manual user input.

In any combination of the above embodiments of the computerized system the operations further comprise tagging the response type with an identifier (ID) and caching the ID in computer memory, wherein the causing of the response to the voice utterance is based on the ID cached in the computer memory.

In any combination of the above embodiments of the computerized system, the operations further comprise receiving the manual user input later in time relative to the voice utterance; and responding to only the manual user input based on the manual user input being received later in time relative to the voice utterance, and refraining from responding to the voice utterance.

In any combination of the above embodiments of the computerized system, the operations further comprise based on the receiving of the manual user input, deactivating a microphone; and in response to the deactivating of the microphone and based on the receiving of the manual user input, responding to only the manual user input.

In any combination of the above embodiments of the computerized system, the operations further comprise receiving the voice utterance later in time relative to the manual user input; and responding to only the voice utterance based on the voice utterance being received later in time relative to the manual user input, wherein the manual user input is excluded from being responded to.

In any combination of the above embodiments of the computerized system, the operations further comprise receiving the voice utterance later in time relative to the manual user input; determining a first instance of a client application associated with the system; based at least in part on information within the first instance, extracting, from the first instance and at the client application, a user view context; based at least in part on the user view context and the voice utterance, causing a determination of a user intent; and based at least in part on the user intent and the voice utterance being received later in time relative the manual user input, responding to the voice utterance by automatically populating, with data, the first instance or a second instance of the client application.

In any combination of the above embodiments of the computerized system, the determination of the user intent includes determining a likely interface task the user is trying to accomplish within the client application by determining the information within the first instance of the client application, wherein the first instance comprises a currently opened page or window of the client application.

In any combination of the above embodiments of the computerized system, the automatically populating includes automatically switching from the first instance to the second instance and automatically populating the second instance with the data.

In any combination of the above embodiments of the computerized system, the first instance comprises a page having a field or a window having a field, and wherein the automatically populating includes automatically populating the field with the data.

In any combination of the above embodiments of the computerized system, the information extracted at the first instance is currently displayed via the user interface.

In some embodiments, a computer-implemented method is provided. The method includes receiving utterance data via a client application, the utterance data being associated with a voice utterance of a user. The method further includes receiving an indication that the user has engaged in manual user input at a user interface of the client application. The method further includes based at least in part on the indication that the user has engaged in the manual user input, causing a deactivation of a microphone such that: the microphone refrains from capturing audio data, or that the audio data received via the microphone is not processed. The method further includes based at least in part on the deactivation of the microphone, causing the client application to respond to the manual user input and refraining from responding to the voice utterance. Advantageously, these and other embodiments, as described herein, improve existing voice assistant technologies because they are fully integrated with client applications so as to execute voice utterances (e.g., perform operations, requests, or carry out tasks associated with an utterance) by causing meaningful interaction with the client application.

In any combination of the above embodiments of the computer-implemented method, the manual user input comprises at least one of: a touch gesture by the user, text entry input by the user, and a pointer click by the user.

In any combination of the above embodiments of the computer-implemented method, the method further comprises receiving the manual user input later in time relative to the voice utterance; and responding to only the manual user input based further on the manual user input being received later in time relative to the voice utterance.

In any combination of the above embodiments of the computer-implemented method, the method further comprises based at least in part on a user view context and the manual user input, determining a user intent; and based at least in part on the user intent, responding to the manual input by populating, with data, a first instance of the client application.

In any combination of the above embodiments of the computer-implemented method, the first instance is a page or window that is currently presented within the client application.

In some embodiments, one or more computer storage media is provided. The one or more computer storage media having computer-executable instructions embodied thereon that, when executed, by one or more processors, cause the one or more processors to perform a method. The method comprises presenting a first instance of a client application. The method further comprises detecting a user action of a user. The method further comprises subsequent to the detecting, capturing audio data comprising a voice utterance associated with the user. The method further comprises based at least in part on information within the first instance, extracting, from the first instance, a user view context. The method further comprises receiving, at the client application, a manual user input associated with the user, the manual user input being performed at a user interface of the client application. The method further comprises causing transmission of the user view context and the voice utterance to one or more services. The method further comprise responding to at least one of the voice utterance and the manual user input by populating, with data, the first instance or a second instance of the client application. Advantageously, these embodiments and others improve existing voice assistant functionality because they support multi-modal input without error and with predictability for the user. This is because these embodiments use new rules that automatically process different user inputs, even when such inputs are conflicting. Some embodiments additionally visually indicate which user inputs were processed. Such visual indication or using the new rules makes it clear for users which inputs were processed.

In any combination of the above embodiments of the one or more computer storage media, the method further comprises responding only to the manual user input based at least in part on receiving an indication that the user has engaged in the manual user input and further based on a determination of user intent by the one or more services; and not responding to voice utterance.

The invention claimed is:
1. A computer-implemented method comprising:
receiving utterance data via a client application, the utterance data being associated with a voice utterance of a user;
receiving an indication that the user has engaged in manual user input at a user interface of the client application, the manual user input corresponding to a request to perform a task at the user interface of the client application;

in response to the receiving of the indication that the user has engaged in the manual user input at the user interface of the client application, causing a deactivation of a microphone such that: the microphone refrains from capturing audio data, or that the audio data received via the microphone is not processed;

based at least in part on the deactivation of the microphone, causing the client application to respond to the manual user input by performing the task at the user interface and refraining from responding to the voice utterance.

2. The computer-implemented method of claim 1, wherein the manual user input comprises at least one of: a touch gesture by the user, text entry input by the user, and a pointer click by the user.

3. The computer-implemented method of claim 1, further comprising:
receiving the manual user input later in time relative to the voice utterance; and
responding to only the manual user input based further on the manual user input being received later in time relative to the voice utterance.

4. The computer-implemented method of claim 1, further comprising:
based at least in part on a user view context and the manual user input, determining a user intent; and
based at least in part on the user intent, responding to the manual input by populating, with data, a first instance of the client application.

5. The computer-implemented method of claim 4, wherein the first instance is a page or window that is currently presented within the client application.

6. One or more computer storage media having computer-executable instructions embodied thereon that, when executed, by one or more processors, cause the one or more processors to perform a method, the method comprising:
presenting a first page of a client application;
detecting a user action of a user;
subsequent to the detecting, capturing audio data comprising a voice utterance associated with the user;
extracting, from the first page, a presented value;
receiving, at the client application, a manual user input associated with the user, the manual user input being performed at a user interface of the client application;
causing transmission of the user view context and the voice utterance to one or more services; and
based at least in part on the extraction of the presented value and whether the voice utterance or the manual user input of the same user was received later in time responding to one of the voice utterance or the manual user input by populating, with data, the first page or a second page of the client application.

7. The one or more computer storage media of claim 6, the method further comprising:
responding only to the manual user input based at least in part on receiving an indication that the user has engaged in the manual user input and further based on a determination of user intent by the one or more services; and not responding to voice utterance.

8. A system comprising:
at least one computer processor; and
one or more computer storage media storing computer-useable instructions that, when used by the at least one computer processor, cause the at least one computer processor to perform operations comprising:

receiving utterance data via a client application, the utterance data being associated with a voice utterance of a user;
receiving an indication that the user has engaged in manual user input at a user interface of the client application, the manual user input corresponding to a request to perform a task at the user interface of the client application;
in response to the receiving of the indication that the user has engaged in the manual user input at the user interface of the client application, causing a deactivation of a microphone such that: the microphone refrains from capturing audio data, or that the audio data received via the microphone is not processed;
based at least in part on the deactivation of the microphone, causing the client application to respond to the manual user input by performing the task at the user interface and refraining from responding to the voice utterance.

9. The system of claim 8, wherein the manual user input comprises at least one of: a touch gesture by the user, text entry input by the user, and a pointer click by the user.

10. The system of claim 8, further comprising:
receiving the manual user input later in time relative to the voice utterance; and
responding to only the manual user input based further on the manual user input being received later in time relative to the voice utterance.

11. The system of claim 8, the operations further comprising:
based at least in part on a user view context and the manual user input, determining a user intent; and
based at least in part on the user intent, responding to the manual input by populating, with data, a first instance of the client application.

12. The system of claim 11, wherein the determination of the user intent includes determining a likely interface task the user is trying to accomplish within the client application by determining the information within the first instance of the client application, wherein the first instance comprises a currently opened page or window of the client application.

13. The system of claim 11, wherein the first instance is a page or window that is currently presented within the client application.

14. The system of claim 11, wherein the populating includes automatically switching from the first instance to the second instance and automatically populating the second instance with the data.

15. The system of claim 11, wherein the first instance comprises a page having a field or a window having a field, and wherein the populating includes automatically populating the field with the data.

16. The system of claim 8, wherein the operations further comprising: detecting a user action, and wherein the user action includes at least one of: a wake word issued by the user and an interaction with an element of the user interface.

17. The system of claim 8, wherein the operations further comprising:
determining that a second voice utterance is associated with a first response type;
determining that the second voice utterance was received prior to the receiving of the manual user input; and
based at least in part on the determining that the second voice utterance is associated with the first response type and the determining that the second voice utterance was received prior to the receiving of the manual user input, causing a response to the second voice utterance.

18. The system of claim 17, wherein the operations further comprise tagging the first response type with an identifier (ID) and caching the ID in computer memory, wherein the causing of the response to the second voice utterance is based on the ID cached in the computer memory.

19. The system of claim 8, the operations further comprising:
- receiving the manual user input later in time relative to the voice utterance; and
- responding to only the manual user input based further on the manual user input being received later in time relative to the voice utterance, and refraining from responding to the voice utterance.

20. The system of claim 8, the operations further comprising:
- receiving a second voice utterance later in time relative to the manual user input; and
- responding to the second voice utterance based on the voice utterance being received later in time relative to the manual user input.

\* \* \* \* \*